US012046935B2

(12) United States Patent
Botts

(10) Patent No.: US 12,046,935 B2
(45) Date of Patent: Jul. 23, 2024

(54) SYSTEMS AND METHODS FOR BATTERY IMPEDANCE MATCHING TO FACILITATE IMPROVED BATTERY CHARGING

(71) Applicant: Premergy, Inc., Macon, GA (US)

(72) Inventor: Richard Edward Botts, Griffin, GA (US)

(73) Assignee: Premergy, Inc., Macon, GA (US)

( * ) Notice: Subject to any disclaimer, the term of this patent is extended or adjusted under 35 U.S.C. 154(b) by 203 days.

(21) Appl. No.: 17/711,083

(22) Filed: Apr. 1, 2022

(65) Prior Publication Data

US 2022/0302717 A1 Sep. 22, 2022

Related U.S. Application Data

(63) Continuation of application No. 16/851,295, filed on Apr. 17, 2020, now Pat. No. 11,322,952, which is a continuation of application No. 15/377,235, filed on Dec. 13, 2016, now Pat. No. 10,673,257, which is a continuation of application No. 13/869,642, filed on
(Continued)

(51) Int. Cl.
| | | |
|---|---|---|
| *H02J 7/00* | (2006.01) | |
| *H02J 7/14* | (2006.01) | |
| *H02K 1/17* | (2006.01) | |
| *H02K 1/2706* | (2022.01) | |
| *H02K 7/09* | (2006.01) | |
| *H02K 13/10* | (2006.01) | |
| *H02K 31/02* | (2006.01) | |
| *H02K 1/27* | (2022.01) | |

(52) U.S. Cl.
CPC .......... *H02J 7/0042* (2013.01); *H02J 7/0024* (2013.01); *H02J 7/007* (2013.01); *H02J 7/14* (2013.01); *H02K 1/17* (2013.01); *H02K 1/2706* (2013.01); *H02K 7/09* (2013.01); *H02K 13/10* (2013.01); *H02K 31/02* (2013.01); *H02J 7/0068* (2013.01); *H02K 1/27* (2013.01); *Y02T 10/70* (2013.01)

(58) Field of Classification Search
CPC ........ H02J 7/0042; H02J 7/0024; H02J 7/007; H02J 7/14; H02J 7/0068; H02K 1/17; H02K 1/2706; H02K 1/27; H02K 7/09; H02K 31/02; H02K 13/10
USPC ........................................ 307/104
See application file for complete search history.

(56) References Cited

U.S. PATENT DOCUMENTS

| | | |
|---|---|---|
| 4,012,651 A | 3/1977 | Burson |
| 4,816,709 A | 3/1989 | Weldon |

(Continued)

*Primary Examiner* — Zixuan Zhou
(74) *Attorney, Agent, or Firm* — Eversheds Sutherland (US) LLP

(57) ABSTRACT

Systems, methods, and apparatus for providing a homopolar generator charger with an integral rechargeable battery. A method is provided for converting rotational kinetic energy to electrical energy for charging one or more battery cells. The method can include rotating, by a shaft, a rotor in a magnetic flux field to generate current, wherein the rotor comprises an electrically conductive portion having an inner diameter conductive connection surface and an outer diameter conductive connection surface, and wherein a voltage potential is induced between the inner and outer diameter connection surfaces upon rotation in the magnetic flux field. The method can also include selectively coupling the generated current from the rotating rotor to terminals of the one or more battery cells.

20 Claims, 13 Drawing Sheets

Related U.S. Application Data

Apr. 24, 2013, now Pat. No. 9,553,463, which is a continuation-in-part of application No. 13/435,312, filed on Mar. 30, 2012, now Pat. No. 8,581,559, which is a continuation of application No. 13/271,833, filed on Oct. 12, 2011, now Pat. No. 8,164,228.

(60) Provisional application No. 61/637,810, filed on Apr. 24, 2012.

(56) References Cited

U.S. PATENT DOCUMENTS

| | | |
|---|---|---|
| 5,451,825 A | 9/1995 | Strohm |
| 6,097,124 A | 8/2000 | Rao |
| 6,351,097 B1 | 2/2002 | Oh |
| 6,957,947 B2 | 10/2005 | Williams |
| 7,489,048 B2 | 2/2009 | King et al. |
| 2002/0159214 A1 | 10/2002 | Perlick et al. |
| 2004/0021387 A1 | 2/2004 | Whitesell |
| 2004/0263125 A1 | 12/2004 | Kanno et al. |
| 2005/0093508 A1 | 5/2005 | Taniguchi et al. |
| 2008/0179949 A1 | 7/2008 | Besser et al. |
| 2009/0267588 A1* | 10/2009 | Schmitz .................. H02J 7/345 323/352 |
| 2009/0289512 A1 | 11/2009 | Prucher |
| 2010/0109445 A1 | 5/2010 | Kurs et al. |
| 2010/0273033 A1* | 10/2010 | Fujikawa .......... H01M 10/0525 429/61 |
| 2012/0235527 A1 | 9/2012 | Lee |
| 2013/0063085 A1* | 3/2013 | Takada .................. H01M 10/48 320/108 |
| 2013/0335028 A1 | 12/2013 | Choi |

* cited by examiner

SYSTEMS AND METHODS FOR BATTERY IMPEDANCE MATCHING TO FACILITATE IMPROVED BATTERY CHARGING

CROSS-REFERENCE TO RELATED APPLICATIONS

This application is a continuation of U.S. application Ser. No. 16/851,295, filed Apr. 17, 2020, now U.S. Pat. No. 11,322,952, which is a continuation of U.S. application Ser. No. 15/377,235, filed Dec. 13, 2016, now U.S. Pat. No. 10,673,257, which is a continuation of U.S. application Ser. No. 13/869,642 filed Apr. 24, 2013, now U.S. Pat. No. 9,553,463, which claims priority to U.S. Provisional Application Ser. No. 61/637,810 filed Apr. 24, 2012 and is a continuation-in-part of U.S. application Ser. No. 13/435,312 filed on Mar. 20, 2012, now U.S. Pat. No. 8,581,559, which is a continuation of U.S. Pat. No. 8,164,228 issued on Apr. 24, 2012 and filed on Oct. 12, 2011, the entire contents of which are incorporated by reference herewith.

TECHNICAL FIELD

This invention generally relates to battery charging, and in particular, to a homopolar electrical generator charger for a rechargeable battery.

BACKGROUND

A homopolar generator is a unique electrical generator, sometimes referred to as a Faraday disk after Michael Faraday, who developed the basic device in 1831. The homopolar generator can convert rotational energy into direct current by rotating an electrically conductive disc in a plane perpendicular to a magnetic field. Faraday's law of electromagnetic induction and/or Lorentz's force law can be utilized to explain the operation of the homopolar generator. The radial movement of the electrons in the disc in the presence of the magnetic field produces a charge separation between the center of the disc and its rim, and if the circuit is completed between the disk center and rim, an electric current will be produced when the disc is rotated.

Versions of the homopolar generator have been used to supply currents up to 2 million amperes, but practical use has been limited due primarily to the low voltage output and high $I^2R$ losses that can arise from imperfect electrical brush connections to connect external circuits.

Conventional battery chargers and alternators are typically designed for charging several battery cells in series, with charging currents limited by the additive internal resistance of each cell in the series. Charging cells of a battery in series tends to require extended charging periods. For example, a typical multi-cell 10 ampere-hour battery requires roughly 15 hours to reach full charge from a fully discharged condition with a 1 ampere charger.

Electric cars and other electric vehicles utilize battery packs having multiple rechargeable cells that are connected in series to provide adequate voltages for driving electric motors. One of the barriers for commercial success of the all electric car, however, is the long associated battery charging times. Part of the issue that can contribute to the long charging time is the internal series resistance that limits the amount of charging current that can flow through the battery. Some designers and manufactures have proposed systems to swap out the entire battery each time it is discharged to address the charging time issue.

BRIEF SUMMARY

Some or all of the above needs may be addressed by certain embodiments of the invention. Certain embodiments of the invention may include systems, methods, and apparatus for a homopolar generator with integral rechargeable battery.

According to an example embodiment of the invention, an apparatus is provided. The apparatus includes an elongated shaft defining a longitudinal axis of rotation; at least one rechargeable battery comprising at least one cell having a positive and negative terminal, the at least one battery mounted substantially coaxially with respect to the shaft; one or more magnets for providing a magnetic flux field; a rotor comprising an electrically conductive portion having an inner diameter conductive connection surface and an outer diameter conductive connection surface, the rotor mounted coaxially in communication with the shaft, wherein the rotor is operable to rotate in the magnetic flux field; at least one positive output electrode operable for selective electrical communication with at least one of the battery cell positive terminal, the rotor inner diameter conductive connection surface, or the rotor outer diameter conductive connection surface, wherein the at least one positive output electrode is stationary relative to the rotating shaft; at least one negative output electrode operable for selective electrical communication with at least one of the battery cell negative terminal, the rotor outer diameter conductive connection surface, or the rotor outer diameter conductive connection surface, wherein the at least one negative output electrode is stationary relative to the rotating shaft; and a connection system comprising one or more brushes for electrically connecting one or more of the rotor conductive connection surfaces or the battery terminals with one or more of the output electrodes. According to an example embodiment, the rechargeable battery is operable to rotate with the rotor.

According to another example embodiment, a system is provided. The system includes a motor; an elongated shaft defining a longitudinal axis of rotation; at least one rechargeable battery comprising at least one cell having a positive and negative terminal, the at least one battery mounted substantially coaxially with respect to the shaft; one or more magnets for providing a magnetic flux field; a rotor comprising an electrically conductive portion having an inner diameter conductive connection surface and an outer diameter conductive connection surface, the rotor mounted coaxially in communication with the shaft, wherein the rotor is operable to rotate in the magnetic flux field; at least one positive output electrode operable for selective electrical communication with at least one of the battery cell positive terminal, the rotor inner diameter conductive connection surface, or the rotor outer diameter conductive connection surface, wherein the at least one positive output electrode is stationary relative to the rotating shaft; at least one negative output electrode operable for selective electrical communication with at least one of the battery cell negative terminal, the rotor outer diameter conductive connection surface, or the rotor outer diameter conductive connection surface, wherein the at least one negative output electrode is stationary relative to the rotating shaft; and a connection system comprising one or more brushes for electrically connecting one or more of the rotor conductive connection surfaces or the battery terminals with one or more of the output electrodes.

According to another example embodiment, a method is provided for converting rotational kinetic energy to electrical energy for charging one or more battery cells. The method includes rotating, by a shaft, a rotor in a magnetic flux field to generate current, wherein the rotor includes an electrically conductive portion having an inner diameter conductive connection surface and an outer diameter conductive connection surface, and wherein a voltage potential is induced between the inner and outer diameter connection surfaces upon rotation in the magnetic flux field; and selectively coupling the generated current from the rotating rotor to terminals of the one or more battery cells, wherein the terminals comprise a positive terminal and a negative terminal, and wherein the positive terminal and a negative terminal are electrically connected to respective inner and outer, or outer and inner diameter connection surfaces, wherein the at least one battery cell is mounted substantially coaxially with respect to the shaft.

Other embodiments, features, and aspects of the invention are described in detail herein and are considered a part of the claimed inventions. Other embodiments, features, and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein.

DETAILED DESCRIPTION OF THE INVENTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Example embodiments can include a homopolar generator having one or more rechargeable battery cells. In example embodiments, electrical connections may be selectively switched to connect the cells to the homopolar rotor center and rim during rotation to charge and/or discharge the cells simultaneously. In an example embodiment, the one or more rechargeable battery cells can be selectively switched, when appropriate, to an external circuit for providing DC current output. According to example embodiments, the one or more cells can be selectively connected in parallel during charging or discharging. In an example embodiment, two or more cells can be connected in series to provide increased DC voltages for output to an external circuit. According to example embodiments, the rechargeable battery cells may rotate with the conductive rotor and a switching controller to eliminate one or more pairs of brush connections and/or to provide low resistance switchable connections from the generator rotor to the battery cells.

The present application hereby incorporates by reference in its entirety U.S. Pat. No. 7,592,094 to Shawn Kelley, et. al., entitled "Device, System, and Method for Improving Efficiency and Preventing Degradation of Energy Storage Devices."

Various parts may be used and arranged for achieving efficient battery charging, according to example embodiments of the invention, and will now be described with reference to the accompanying figures.

Figure 1:
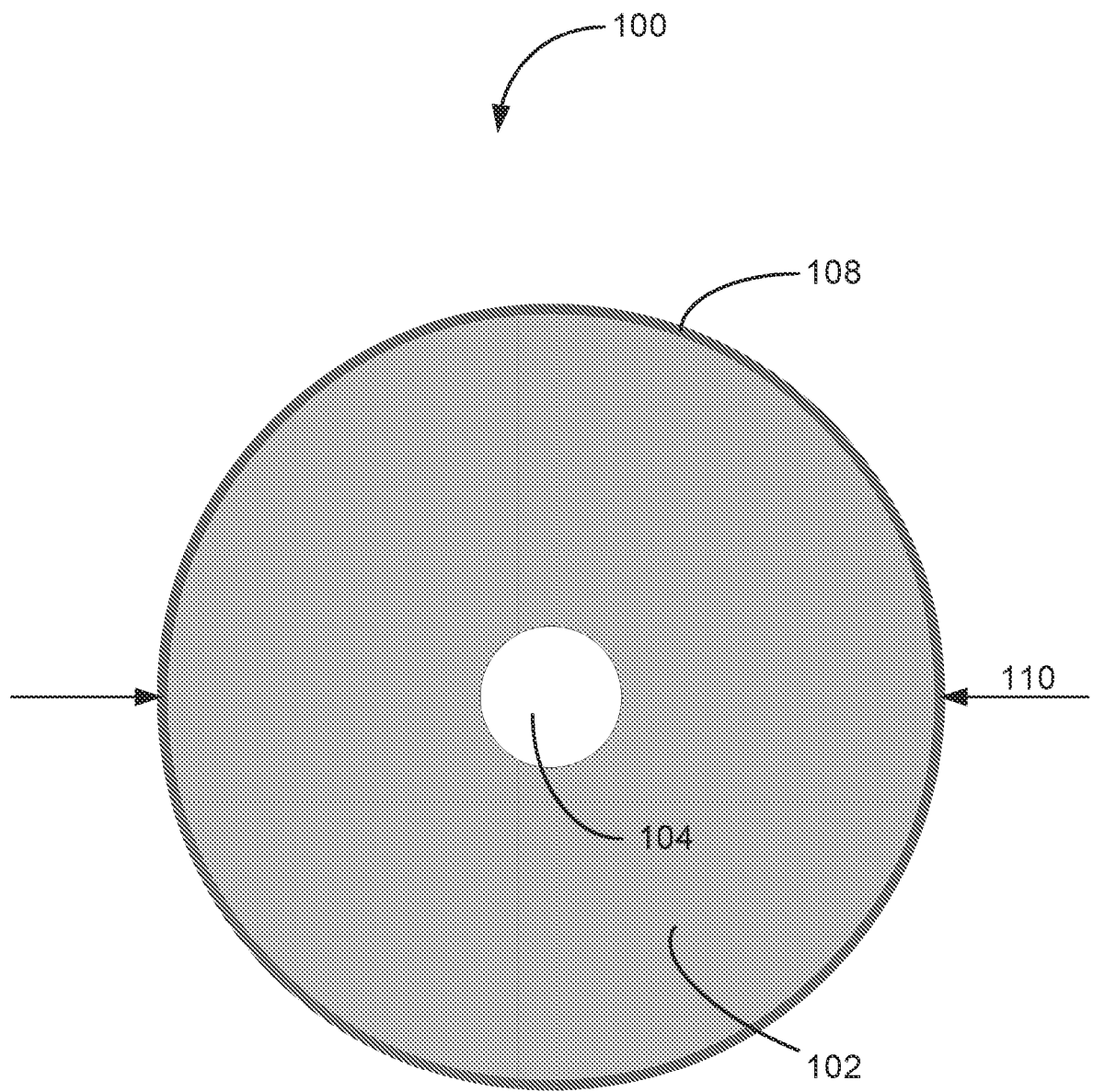
FIG. 1 is a diagram of an illustrative homopolar generator rotor, according to an example embodiment of the disclosure.

FIG. 1 depicts an illustrative homopolar generator 100 with a rotor 102, according to an example embodiment. According to an example embodiment, the rotor 102 includes at least a conductive surface. In other example embodiments, the rotor 102 may be a solid conductive disk. In accordance with example embodiments, additional rotors may be utilized in the homopolar generator charger. In example embodiments, the conductive portion of the rotor may include metals with high conductivity, preferably copper. However, other metals including silver, gold, aluminum, nickel, etc may be utilized.

According to an example embodiment, the rotor 102 may be in mechanical and electrical contact with a shaft 104, which may provide linkage for rotation, and may provide a rotor inner diameter connection surface. In example embodiments, the rotor may include an outer diameter connection surface 108. In accordance with example embodiments, a voltage potential may be induced between the inner diameter (in electrical connection with the shaft 104, for example) and the outer diameter connection surface 108. The voltage polarity is dependent on the direction of rotation and the orientation of the magnetic field with respect to the rotor rotation. The voltage magnitude is a function of the square of the rotor radius, the rotation speed, and the magnetic field strength. According to an example embodiment, the rotor radius 110 may be set to provide a certain voltage output for a rotation speed and magnetic field strength. According to other example embodiments, the shaft 104 may be electrically isolated from the rotor 102, and an inner diameter connection surface may be provided for completing a circuit for which current may flow.

Figure 2:
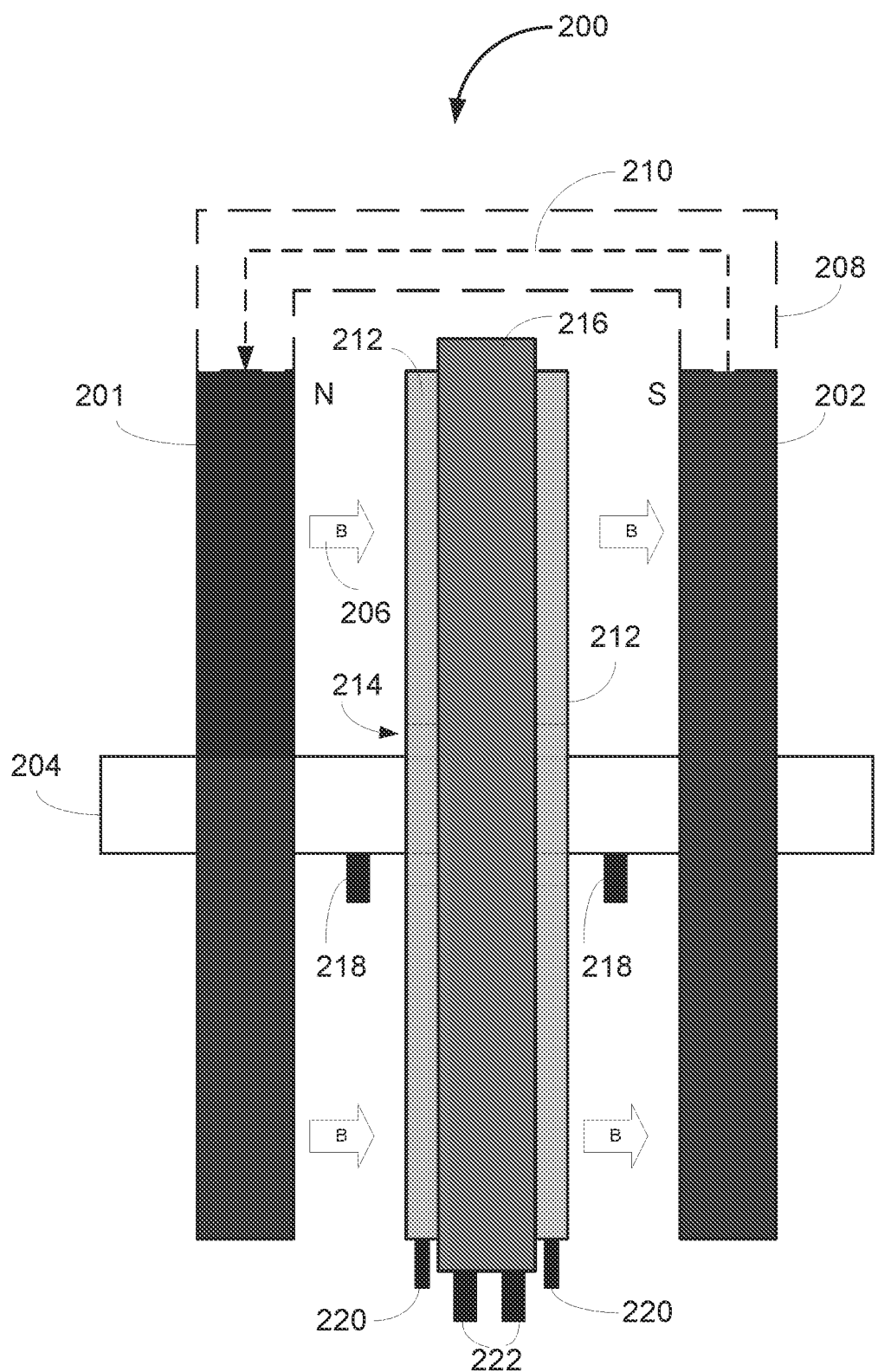
FIG. 2 is a side-view depiction of an illustrative homopolar generator charger with an integral battery, according to an example embodiment of the disclosure.

FIG. 2 is a side-view depiction of an illustrative homopolar generator with an integral battery 200, according to an example embodiment. In this example embodiment, a magnet assembly, having a north pole 201 and a south pole 202, may provide a magnetic flux 206 for interaction with the conductive rotor 212. In an example embodiment, the 201, 202 may be joined by an optional return path 208 to assist in aiding return flux 210 and to reduce the magnetic reluctance associated with the magnetic flux path. According to example embodiments, the magnets, as described herein, may have a sufficient diameter to produce a magnetic field with a diameter that is larger than the diameter of the rotor so that the entire rotor is exposed to the magnetic field. According to example embodiments, multiple permanent magnets may be arranged, for example, in an adjacent north-south-north-south configuration, or with intervening components between the magnets.

According to one example embodiment, the magnet assembly may be mechanically separated from the shaft 204 and mounted separately so that the shaft 204 and other attached components may rotate independently from the magnet assembly. In another example embodiment, the magnet assembly may be mechanically coupled with the shaft 204, and the magnet assembly may rotate with the shaft 204. Certain advantages/disadvantages in terms of weight, inertia, mounting complexity, etc. for example, may provide reasoning for rotating the magnets, or for providing stationary magnets. A surprising result that is not readily apparent from Faraday's laws is that it does not matter whether the magnetic field rotates or not. In one embodiment, rotating magnets may add to the mass of the generator and may require more inertial energy to spin the rotor while not otherwise changing the outcome in any useful way. However, according to another example embodiment, it may be advantageous to have the extra mass of the spinning magnet for storage of rotational energy.

According to example embodiments, the homopolar generator 200 includes a rechargeable battery 216. In one example embodiment, the rechargeable battery 216 can be fixed to the shaft 204 and/or the conductive rotor 212, and may rotate with these parts. In another example embodiment, the shaft 204 and/or the conductive rotor 212 can be configured to rotate independent of the rechargeable battery 216.

According to example embodiments, the shaft 218 may provide an inner diameter connection surface for providing a slideable electrical connection with a first electrode brush 218. In an example embodiment, the conductive rotor 212 can include an outer diameter connection surface (as in 110 of FIG. 1) for providing a slideable electrical connection with a second electrode brush 220. In accordance with example embodiments, if the rechargeable battery 216 may include two or more outer diameter connection surfaces for slideable electrical connections with battery electrode brushes 222. According to example embodiments, two brushes may be utilized to provide circuit connection access to the positive and negative terminal of the rechargeable battery. In example embodiments, multiple rechargeable battery cells 216 may be utilized in the homopolar generator charger 200, each with similar connections for external circuits, as previously described.

According to example embodiments, and as will be further explained with reference to FIGS. 3, 5, and 6, a switching controller may be used to selectively connect, switch, and/or disconnect circuits associated with the homopolar generator charger 200.

Many other configurations for the rechargeable batteries 216, the conductive rotor 212, the magnets 201, 202, and the associated connecting components may be envisioned without departing from the scope of the inventions. For example, it may be advantageous to electrically isolate the shaft 204 from the rest of the mechanism. In such an example embodiment, an optional insulator 214 may be utilized to electrically separate the inner diameter of the conductive rotor 212 from the shaft 204. In this example embodiment, the first electrode brushes 218 may be configured to contact with an inner diameter of the conductive rotor 212, at a slideable connection surface on the conductive rotor at a diameter outside the region of the optional insulator 214.

Figure 3:
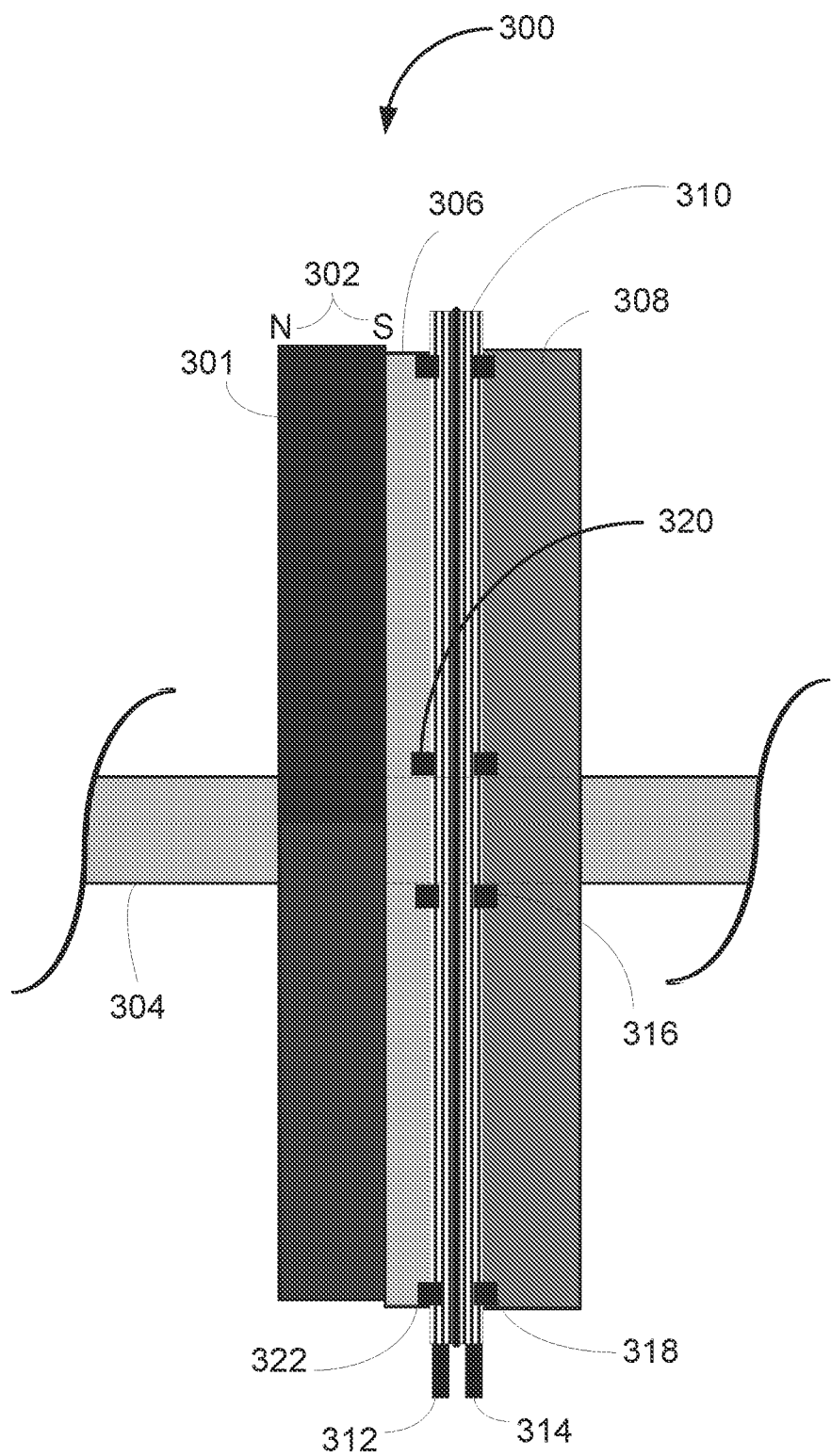
FIG. 3 is a side-view depiction of another illustrative homopolar generator charger with an integral battery, according to an example embodiment of the disclosure.

FIG. 3 depicts yet another example embodiment of a homopolar generator 300 having a battery 308 and a switching controller 320 that are operable for rotating with the conductive rotor 306. In this example embodiment, the magnet 301 may be configured to be stationary, or it may be configured to rotate with the shaft 304, the conductive rotor 306, the switching controller 310 and the battery 308. In this example embodiment, one magnet 301 is depicted having opposing poles 302 in a plane perpendicular to the conductive rotor 306 so that the magnetic lines of flux pass substantially perpendicularly through the conductive rotor. Other example embodiments may include more than one magnet 301 (such as in FIG. 1).

The following illustrative example may help provide part of the reasoning for having a direct electrical connection configuration, as shown in FIG. 3. A mid-sized, typical homopolar generator may be designed to produce an output of 3 volts at a current of 1000 amperes (3 KW). A slip ring pair with brushes for connecting with the rotor may have a combined series resistance of 0.01 ohm. The $I^2R$ loss associated with brush connections is $1000^2 \times 0.01 = 10$ KW, which is three times greater than the output of the generator. Therefore, the typical homopolar generator almost always ends up being extremely inefficient. According to example embodiments, FIG. 3 depicts direct electrical connections 320, 322 from the conducting rotor to the switching controller 310, and direct electrical connections 316, 318 to/from the battery 308. According to example embodiment, direct electrical connection may provide low resistance connections among the rotor 306, controller 320, and battery 308 so that $I^2R$ losses may be minimized.

In the example embodiment of FIG. 3, first electrode brushes 312 and second electrode brushes 314 may be utilized for electrically completing connections from the switching controller 310 to external circuits. For example, the first electrode brush 312 may connect to a ground or negative portion of an external (and non-rotating) circuit, and second electrode brush 314 may connect to a positive portion of the external circuit, or vice versa.

According to example embodiments of the invention, the direct connections 316, 318, 320, 322 may provide low resistance connections for charging the battery 308. In certain example embodiments, the battery 308 may include multiple cells, each with direct connection to the controller 310. According to an example embodiment, the controller 310 may provide connections for hooking each of the battery cells in series for outputting power at higher voltages, and perhaps lower currents, so that less power is lost at the electrode brushes 312, 314, which provide slideable electrical connections, for example, to non-rotating external circuits. Additional details for this embodiment will be further described in reference to FIG. 6.

Figure 4:
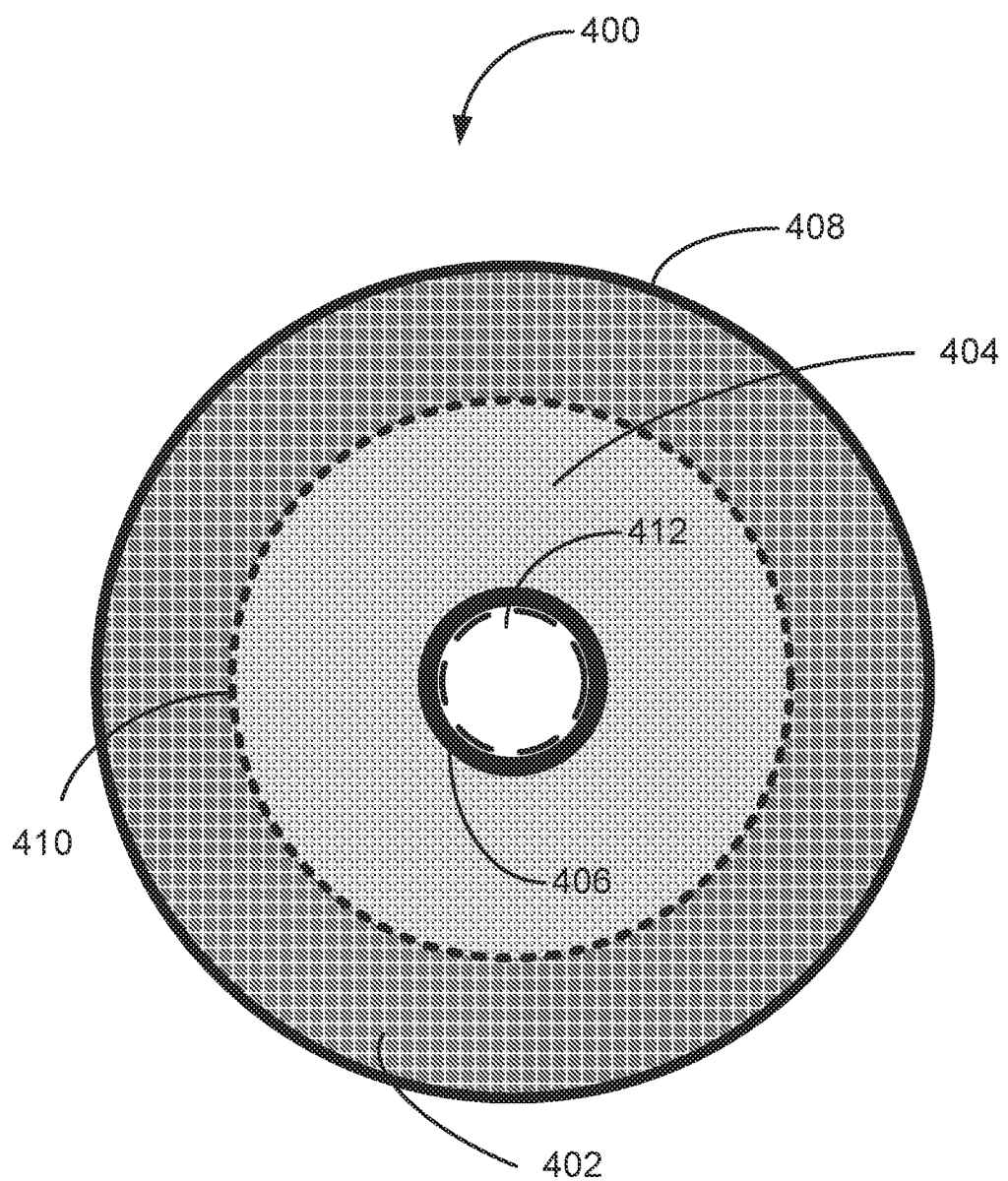
FIG. 4 is a diagram a rechargeable battery for use with the homopolar generator charger, according to an example embodiment of the disclosure.

FIG. 4 depicts an example rechargeable battery 400, having an anode 402 a cathode 404, a first electrode 406, and a second electrode 408. According to an example embodiment, the rechargeable battery 400 may include a separator 410 between the anode 402 and the cathode 404. According to an example embodiment, the anode and cathode placement may be switched to provide opposite polarity for the battery output electrodes. According to example embodiments, the polarity of the battery, which may depend on the orientation or placement of the anode and cathode, may be matched with the polarity output from the homopolar generator rotor, which depends on the direction of rotation of the rotor, and the orientation of the magnetic field. According to one example embodiment, the rechargeable battery 400 may rotate with the shaft, the rotor, and switching controller. In such an embodiment, the battery electrodes 406, 408 may be directly connected to connections associated with a switching controller (as in FIG. 3). In another example embodiment, the battery may be configured to be non-rotating, or to rotate independently from the rotor. In such embodiments, an optional bearing 412 may be utilized so that the shaft may rotate independent of the battery 400.

Figure 5:
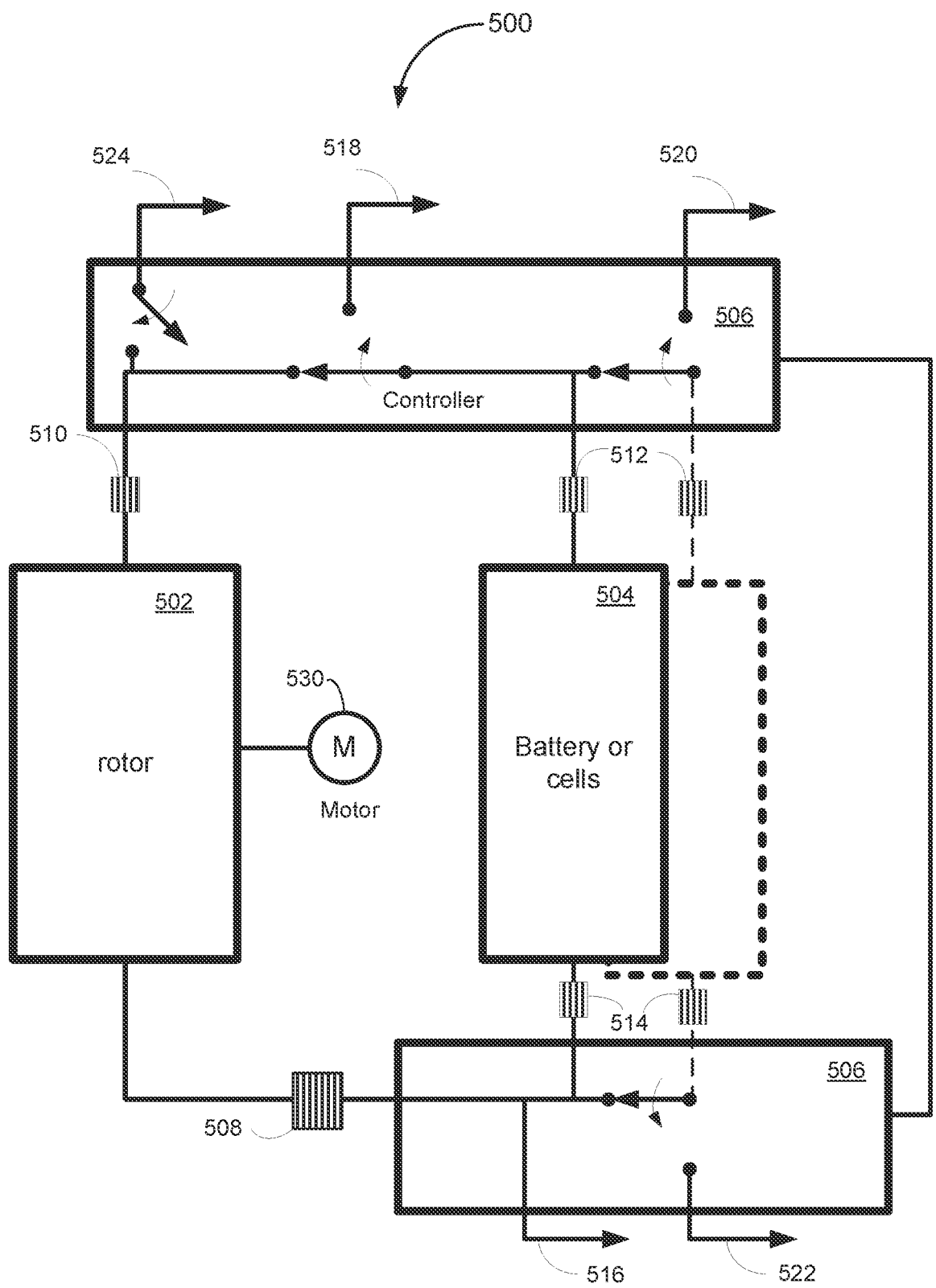
FIG. 5 is a circuit diagram of a homopolar generator charger with a rechargeable battery and a stationary switching controller, according to an example embodiment of the disclosure.

FIG. 5 depicts an example circuit diagram of a homopolar generator charger 500 with a non-rotating switching controller 506. In this example embodiment, a motor 530 may be utilized to turn the rotor 502. (The magnetic field is not shown in this diagram, but it is assumed present with the correct orientation). According to an example embodiment, a battery 504 (or optionally, two or more cells as indicated by the dashed lines) may be selectively connected to the rotor 502 or to output connections 516, 518, 520, 522 via battery brushes 512, 514, and/or the rotor outer brush 510 and shaft brush 508. In an example embodiment, the switching controller 506 may connect the rotor positive portion to an output 524, which may be configured for output independent, or in conjunction with the battery output. According to example embodiments, the switching controller may be utilized for connecting two or more battery cells 504 in parallel for charging, and may be operable to isolated cell positive and negative outputs for serial connection of the batteries for higher voltage output. In accordance with example embodiments, the switching controller 506 may electrically disconnect one or more connections with the rotor 502 when the rotor speed falls below a given threshold value, or when charging current associated with the batteries has reached a predetermined value.

Figure 6:
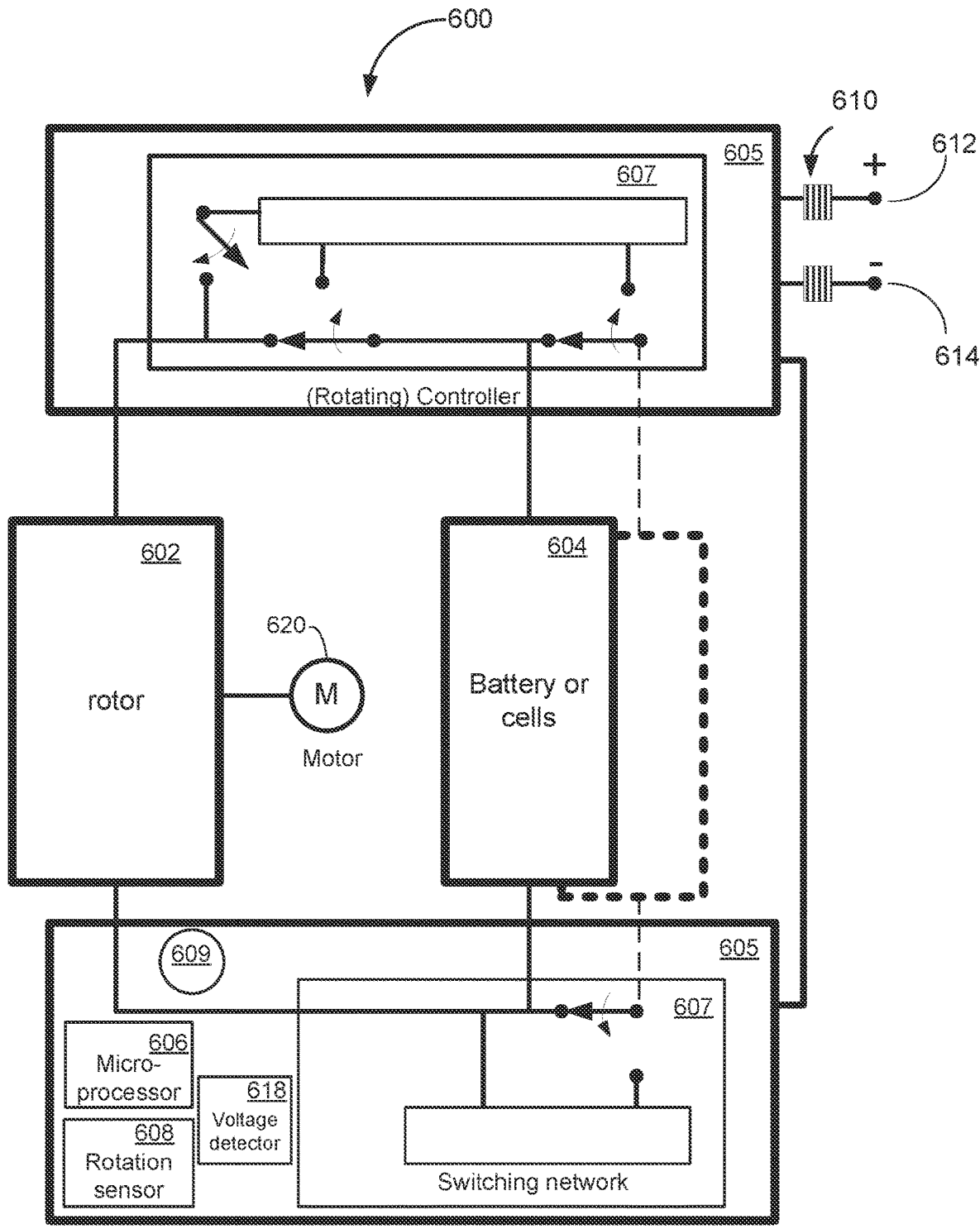
FIG. 6 is a circuit diagram of a homopolar generator charger with a rotating rechargeable battery and switching controller, according to an example embodiment of the disclosure.

FIG. 6 depicts an example circuit diagram of a homopolar generator charger 600 with an integrated switching controller 605 and battery or cells 604 that are operable to rotate with the rotor 602. The example circuit diagram of FIG. 6 may correspond to a configuration similar to that as shown in FIG. 3. According to an example embodiment, a motor 620 may be used to rotate the rotor 602, the switching controller 605, and the battery or cells 604. In other example embodiments, the rotor 602, switching controller 605, and the battery or cells 604 may be rotated via components associated with a regenerative braking system. According to an example embodiment, the rotor 602, switching controller 605, and the battery or cells 604 rotate in concert and at least some of the electrical connections between these devices may be hard wired. According to an example embodiment, two output brushes 610 may provide an electrical connection from the components that are operable for rotating, to a non-rotating positive output electrode 612 and a non-rotating negative electrode 614. According to example embodiments, the reduction of brushes may provide power efficiency advantages, as previously discussed. In accordance with certain example embodiments, the output brushes 610 may be placed in close proximity to (or on) the rotor shaft of the homopolar generator charger 600 to reduce friction and to minimize wear.

According to example embodiments, the switching controller 605 may include one or more switching networks 607 that may be utilized to selective close and open circuits among the rotor 602, the battery or cells 604, and the output brushes 610. In example embodiments, one or more diodes may be utilized to limit current flow to one direction in any of the circuits. According to example embodiments, relays or other switching devices having high current capacity and low resistance when engaged may be utilized for switching elements in the switching network 607. In example embodiments, the controller 605 may additionally include a microprocessor 606, a rotation sensor 608, a voltage detector 618, and/or a battery 609. In another example embodiment, a receiver and/or transmitter may be included in the controller 605 for wireless communication with an external controller.

According to an example embodiment, the microprocessor 606 may be utilized for receiving information, and for directing the switching network 607 based upon input such as rotation speed, rotation direction, etc. According to example embodiments, the voltage detector circuit 618 may be used for monitoring the voltage across the battery, one or more cells, and/or the rotor. In example embodiments, the microprocessor 606 may also receive signals from the voltage detector circuit 618 and may direct the switching network 607 accordingly. According to example embodiments, the switching network 607 may connect the battery or cells 604 with the rotor 602 for charging when a voltage across the rotor 602 has reached or exceeded a predetermined value, or when a certain rotational speed has been reached. According to an example embodiment, power may be supplied externally by the homopolar generator charger 600 via output brushes 610 by connecting one or more of the rotor 602, battery or cells 604 to the output. According to an example embodiment, the rotor 602 may be switched out of circuit and the battery or cells 604 may be connected to the output for supplying power to external devices via the output brushes 610. According to example embodiments, two or more cells may be connected in series via the switching network 607 to provide power output at an increased voltage.

Figure 7:
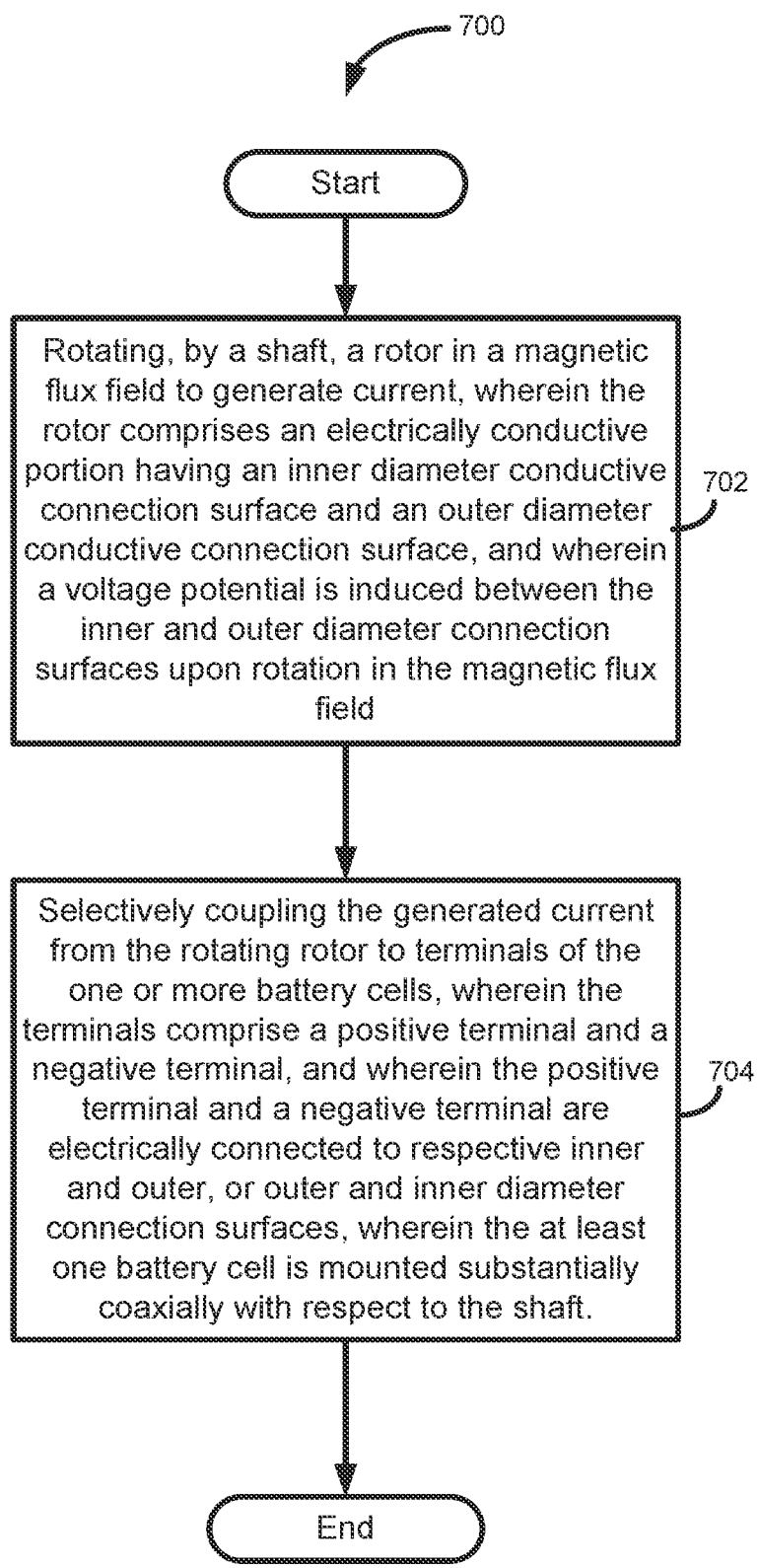
FIG. 7 is a flow diagram of an example method according to an example embodiment of the disclosure.

An example method 700 for converting rotational kinetic energy to electrical energy for charging one or more battery cells will now be explained with reference to FIG. 7. In block 702, and according to an example embodiment, the method 700 includes rotating, by a shaft, a rotor in a magnetic flux field to generate current, wherein the rotor comprises an electrically conductive portion having an inner diameter conductive connection surface and an outer diameter conductive connection surface, and wherein a voltage potential is induced between the inner and outer diameter connection surfaces upon rotation in the magnetic flux field. In block 704, the method 700 includes selectively coupling the generated current from the rotating rotor to terminals of the one or more battery cells, wherein the terminals comprise a positive terminal and a negative terminal, and wherein the positive terminal and a negative terminal are electrically connected to respective inner and outer, or outer and inner diameter connection surfaces, wherein the at least one battery cell is mounted substantially coaxially with respect to the shaft. The method 700 ends after block 704.

According to example embodiments, brushes may be utilized for making electrical connections of surfaces on the rotor, controller, and/or battery. According to example embodiments, such surfaces may include slip rings that may provide conductive surfaces for which the brushes may make electrical contact with portions of the rotor, controller, and/or battery. In example embodiments, the brushes may include metal fibers, carbon compounds, or conductive liquids, such a liquid metal.

According to example embodiments, certain technical effects can be provided, such as creating certain systems, methods, and apparatus that provide efficient utilization of energy conversion. Example embodiments of the invention can provide the further technical effects of providing systems, methods, and apparatus for providing high currents for charging battery cells.

In example embodiments of the invention, the homopolar generator charger 200, 300, 500, 600 may include any number of hardware and/or software applications that are executed to facilitate any of the operations.

In example embodiments, one or more I/O interfaces may facilitate communication between the homopolar generator charger 200, 300, 500, 600, and one or more input/output devices. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the homopolar generator charger inputs 200, 300, 500, 600 and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ (Owned by Telefonaktiebolaget LM Ericsson) enabled network, a Wi-Fi™ (owned by Wi-Fi Alliance) enabled network, a satellite-based network any wired network, any wireless network, etc., for communication with external devices and/or systems.

As desired, embodiments of the invention may include the homopolar generator charger 200, 300, 500, 600, with more or less of the components illustrated in FIGS. 1-6.

According to additional example embodiments, the rotor may include a composite conductive structure. For example, the rotor may be made with materials including, but not limited to fiberglass, sintered metals, alloys, graphite composites, etc. According to example embodiments, the rotor conductive surface or disk may be evaporated or deposited onto a base material. According to example embodiments, the rotor may include a copper outer casing. According to example embodiments, the homopolar generator charger may include an outer casing that may be made of various non-conducting materials with the required structural properties. In example embodiments the homopolar generator may include electrodes or electrical connection regions or surfaces that are made from of nickel oxyhydroxide and/or a hydrogen absorbing alloy. According to example embodiments, two or more rotors can be stacked to provide different configurations, redundancy, and/or increased power output capacity.

According to example embodiments, the homopolar generator charger may provide pulsed current output. For example, a connecting circuit may be completed and opened in succession to provide a current path between the rotor inner and outer conductive regions and other components. In an example embodiment, during the period when the connecting circuit is open, a charge differential may build on the rotor until a balance of charge is met. Closing the circuit may allow the electrons to flow, similar to a capacitor, until charge is depleted.

According to example embodiments, frictional losses due to rotation of the rotor, battery, and other associated rotating components may be reduced by dimpling any surface where there is no brush or contact. This includes unused areas of the shaft and areas that have clearance for air to pass between, and can be applied to the facing surfaces of the magnet array and magnets themselves. According to example embodiments, drag may be reduced via the dimpling by creating a boundary layer of turbulent air at exposed surfaces. In an example embodiment, dimpling may also be utilized to enhance heat dissipation.

According to an example embodiment, the homopolar generator charger's rotor may comprise a solid copper disk and a battery as previously described. Experiments have shown that an 18 inch by ¼ inch solid copper rotor is capable of sustaining 1500 amps in a field of 13000 gauss. In an example embodiment, copper may be applied to the outer surfaces of the rotor via electroplating. In an example embodiment, the rotor may be made from a solid copper disk or from an alloy. In an example embodiment, a solid shaft made from a similar alloy, and configured to pass through the disk center, may facilitate the conduction of electricity and maintain the structural integrity of the unit.

In example embodiments, the rotor and shaft can be supported by various means. According to an example embodiment, a housing or structure may support the rotor assembly in position and may to allow the rotor to rotate on a common axis. According to an example embodiment, ends of the rotor may be supported on roller bearings. In an example embodiment, pressurized gas, oil, or magnetic suspension may be utilized to reduce mechanical resistance. According to example embodiments, ceramics and other non-conducting components may be utilized to eliminate current flow in unwanted areas.

In accordance with example embodiments, current may be supplied to external component, or between components associated with the homopolar generator via brushes. In example embodiments, solid copper, graphite, sintered, liquid metal, or other brushes may be mounted in standard brass holders on each side of the rotor's shaft and on the periphery of the rotor conductor or disk.

According to example embodiments, the generated current and/or voltage output from the homopolar generator rotor may be dependent on the magnitude of the magnetic field, the square of the conductor's radius immersed in the magnetic field of a given magnitude, and the angular velocity of the conductive portion of the rotor. Other factors affecting output include composition and size of the conductor or rotor, mechanical resistance, magnetic coupling with exterior objects, brush materials, etc. Eddy currents allowed to flow in a portion of the disk or conductor outside the field can reduce the efficiency.

According to another example embodiment, portions of the rotor may include embedded wound coils, each connected in a manner to produce a voltage and current output. According to an example embodiment, a stator, comprising multiple stationary magnets arranged in alternating north-south-north-south ring configuration, may be mounted around the center of a larger magnet. In an example embodiment, a drive motor may be integrated with the rotor. In an example embodiment, a wire-wound generator may be utilized as a motor. In accordance with example embodiments, regenerative systems, which may include a generator/motor may be used in conjunction with the homopolar generator charger.

According to this example embodiment, an inner generator/motor may be utilized in conjunction with the rotor of the homopolar generator. For example, an inner generator/motor may comprise a hub-type of wire-wound motor. In accordance with an example embodiment, when the rotor is decelerating or coasting, the rotor may act as a flywheel. In an example embodiment, kinetic energy from the rotor assembly may provide mechanical leverage when the motor is switched to generating mode, such as in a regenerative system. Accordingly, the rotor in the regenerative mode may have certain mechanical advantage due to its proximity to the center of the shaft. However it may have the classic back torque or back electromotive force associated with standard generators. The back torque or back electromotive force may be minimal if designed for low voltage of 3 volts or less.

According to example embodiments, outer (non-rotating) magnets surrounding the inner (rotating) magnets may be utilized for producing the high currents that are typically associated with a homopolar generator with a solid conductor disc rotor. According to example embodiments, rectification may be utilized for the inner magnet portion, and the outer portion associated with the stationary part may produce direct current.

Example embodiments may utilize a circumferentially segmented rotor made of at least two conductors isolated from each other at their peripheries. Other example embodiments may include a rotor having a conductor shaped in the form of a spiral.

In accordance with an example embodiment, the homopolar generator charger may include a composite copper disk mounted inside a magnetically closed metal housing. In an example embodiment, magnets may be attached to the inside of the housing. For example, the housing may include two half pieces, having parabolic-shape, or other suitable shape. In example embodiments, bearings may be mounted in the center of each half, allowing the magnetic flux from ends of the single or stacked magnets to couple back through the housing. This arrangement may reduce external fields and magnetic coupling of exterior ferrous objects. According to an example embodiment, the housing may be made of soft or cast iron. Example embodiments of the housings may be heat treated for fixing dipole alignment (or randomization) of the material. According to an example embodiment, nickel may be included in the housing material to reduce hysteresis. In other example embodiments, laminated structures may be employed reduce induced eddy currents. In an example embodiment, a brush system (solid or liquid) may be mounted and isolated electrically at the center between the halves of the housing structure. In an example embodiment, outer diameter surface of the brush assembly may be constructed from the same materials as the housing halves to allow the magnetic flux a point of return.

According to an example embodiment, the rotor may include integrated rings of individual rechargeable batteries or cells separated by insulators. In one example embodiment, the innermost battery or cell may be placed in a ring adjacent to the shaft. In an example embodiment, the innermost battery or cell may be surrounded radially by a second battery or cell, and so-forth to a desired diameter. According to an example embodiment, as the circumference is increased, the radial thickness of each cell or battery may be modified to keep each battery or cell ring at approximately the same internal resistance.

According to another example embodiment, a straight shaft design may be utilized in high speed applications ranging from approximately 10,000 to approximately 100,000 revolutions per minute. In this embodiment, a shaft may be made of neodymium-iron-boron being solid in construction but with appropriate thickness to carry high currents without overheating. Any number of raised surfaces can be machined into the outer surface of the rotor shaft. According to example embodiment, the raised machined surfaces may be located over the center of any opposing magnetic fields. In an example embodiment, the surface of the shaft may be electroplated with conductive metal to reduce oxidation and provide points of brush contact for current output. According to an example embodiment, the shaft may be capped with bearing supports of magnetic material or ferrous ends for oil, air, and gas or magnetically floated. In accordance with an example embodiment, the shaft, when rotated at high speed, may maintain a negative polarity on the shaft center with charge separation occurring at or near the surface of the shaft. Accordingly, charge separation may occur at the point of the centerline where the magnetic flux is closest to zero. According to example embodiment, brush slots may be filled with a liquid metal and capped under slight pressure, and lugs may be milled into these areas for current extraction. In accordance with an example embodiment, the outer housing may be made from cast iron to close the unused poles and force the internal magnetic flux lines compress and concentrate in the area where outer raised areas of the shaft may intersect the compressed fields at 90 degrees. In an example embodiment, this type of generator can be used in high temperature applications, such as in turbine exhaust systems, and may recover energy form systems that have exhaust as a byproduct of operation. Any enclosed tube in which a liquid, gas, or vapor flows from a high potential to a lower potential is a candidate for this type of generator.

According to an example embodiment, a rotor assembly made of printed circuit material may be utilized to provide a voltage potential or current source. In an example embodiment, the printed circuit rotor may be mounted to shaft. In an example embodiment, the printed circuit rotor may be mounted adjacent to another rotor. Example embodiments may include a multilayer printed circuit rotor. Example embodiments may include an integrated switching controller with or adjacent to the printed circuit rotor. The printed circuit rotor may provide a lightweight design and may allow for complex conductive patterns on the rotor.

Example embodiments may include a conducting disk composed of a conductor or materials that conduct electricity and mounted on a shaft or axle so that it can be rotated within the fields of one or more permanent magnets. According to example embodiments, the magnets have a sufficient diameter to produce a field that is larger than the diameter of the disk or rotor. In an example embodiment, the disk may include a composite copper rotor or other conductor in which current and voltage is known to flow when rotated in a magnetic field. The rotor may include an inner and outer diameter conducting rings or surfaces, as describe previously. The area between the inner and outer diameter conducting rings or surfaces may include layers of capacitor components in a radial orientation. In one example embodiment, the negative terminal of the capacitor component may be connected at the center, and positive terminal may be configured for electrical connection at the outer radius. According to example embodiments, the capacitor may include two conductors separated by a dielectric or non-conductive region or insulator. The conductors thus hold equal and opposite charges on their inner and outer surfaces, and the dielectric develops an electric field. According to example embodiments, the capacitor parts may be arranged in a cylindrical form.

According to example embodiment, rotor systems in a cylindrical shape may have a shaft made from NdFeB material or is cast in the required shape. In example embodiments, beryllium or copper conductors can be fitted to the NdFeB shaft to allow for current extraction directly from the ends.

Example embodiments, may include both the shaft and rotor combination to include both the north and south pole, with a conductor of copper or other material fit to the center of the magnetic rotor. Such an embodiment, may draw current through the magnet and shaft, being the conductor in combination. This example embodiment may result in a configuration similar to a standard rotor system, but it may include composite NdFeB for current conduction. Example embodiments may include electroplating the assembly with highly conductive materials prior to magnetization to both protect the NdFeB from the elements and provide a conductive path for the flow of current, all in one assembly. The assembly may then be magnetized through its thickness one side being north and the other being south. The conducting ring being mounted in its centerline may provide the highest concentration of field strengths, as the highest fields are on the surface and interiors of the magnets. In an example embodiment, the rotor section is magnetized. In this configuration, the north side may rotate in the same direction as the south.

In accordance with example embodiments, the rotor system may be mounted on or in many enclosure configurations, and may have either a closed magnetic flux circuit or open magnetic circuit. According to one example embodiment, a rotor may be supported by non-magnetic pedestals, but may utilize permanent- or electro-magnets. In one example, magnets may be approximately six inches in diameter, one half inch thick, and may include a one and three-eighths inch hole in the center for the shaft to pass through. In an example embodiment, six magnets may be used. According to an example embodiment, the first magnets on each side of a divided housing may be bolted to the housing. The next two magnets may be magnetically coupled north to south or vice versa, three on each side. This arrangement may be utilized to increase and guide the magnetic field. In an example embodiment, two halves of a housing may be assembled in a way that may subsequently receive additional components, including the rotor, shaft, rechargeable battery, switching controller, etc.

In accordance with example embodiments presented herein, it should be understood that the housings and materials mentioned are not only subject to electromagnetic or permanent magnet fields, but also fields that are created by the flow of current within the system. All of the factors that govern permanent sources of fields may also apply to fields created by current flow. In example embodiments, shielding may be utilized to prevent or guide certain forces. For example, some materials, such as non-ferrous brushes and copper conductors, may become attracted to each other through the magnetic force created by current flow, and may need to be shielded to prevent unwanted forces.

In accordance with example embodiments, the rotating portion of the homopolar generator charger may include a stack of disk shaped rotors between stationary or affixed magnets, so that the magnets rotate with the shaft. In this example configuration, the rotor disk, batter disk, magnet disk(s), and any switching control circuitry may be mounted on a common shaft.

Example embodiments may include many options for the type of rechargeable battery or cell to be used in a system, and may be dependent on many factors, such as use or type of application, environment or generator configuration, battery resistance, charge absorption over time, temperature, and issues such as electrolyte separation due to centrifugal forces.

Nickel metal hydride (NmH) batteries may be utilized as rechargeable batteries, according to an example embodiment. Such batteries may have a low internal resistance, and may have high durability. Lithium-based cells (for example, lithium-ion, lithium-polymer, etc.) may be utilized as rechargeable batteries, according to another example embodiment. According to one example embodiment, a dual battery bank system may be used, for example, to provide power from one bank while another bank is charging. According to example embodiment, a switching system, such as the ones previously describe, may be used for selective routing of internal conductors.

According to an example embodiment, an internal or external bank of batteries may be charged at low voltage and high current using the homopolar generator charger. According to this example embodiment, batteries may be charged as individual cells in parallel. According to an example embodiment, the bank can include individual cells. For example, NiM cells may have nominal associated voltages of approximately 1.2 to 1.5 volt. Li cells may have nominal associated voltages in the range of approximately 2.8 to 3.3 volts. Bank size or number of cells may be determined by the amount of energy needed by the load for a given time. A generator size may also be determined based on the size of the battery bank. For example, 180 1.2 volt batteries may require approximately 300 amps to recover from a 90% discharge. An example generator capable of providing the 300 amps and at a voltage of 1.5 volts, according to embodiments, could conceivably recharge the bank in 15 minutes. If the depth of discharge is less, then the time required to reach 100% charge may be reduced. For comparison purposes, a bank of this size can take from 2 to 20 hours to recharge by conventional means, particularly if the batteries are charged in series.

According to example embodiments, after reaching full (or near full charge), the battery bank may be switched to a series configuration to provide an increased voltage output for powering devices. In an example when a discharge limit is reached, the bank may be switched back to parallel and current may be directed to charge the bank.

According to an example embodiment, and as previously discussed, a battery or cell bank may be rotated with the rotor. In an example embodiment, a disk shaped battery may include a center hole being either a positive or negative pole. In an example embodiment, the battery may be approximately 8 inches in diameter, approximately $5/16$ of an inch thick with approximately a 1 inch diameter hole in the center for the shaft to pass through, or for attachment to the shaft. In an example embodiment, the outer shell of the battery may be copper or copper clad to form the rotor. According to an example embodiment, the negative terminal of the battery may include an electrode composed of a hydrogen absorbing alloy. The electrode may be in a grid or it may be perforated to increase its surface area. According to example embodiments, the positive electrode can include nickel oxyhydroxide. According to an example embodiment, a disk battery of this size would weigh approximately 2.5 pounds. Each battery may be capable of 800 to 1000 watts per kilogram specific power.

According to example embodiments, one or more rotors may be mounted on a common shaft. Each may be separated by a disk shaped magnet with the poles on the faces north and south. Such an example configuration may also be connected in series to provide higher voltage potentials but at lower amperage capacity. The reverse is also true with lower potential and higher amperage capacity.

According to example embodiments, the applications for the homopolar generator charger system may include, but are not limited to wind energy harnessing, automotive electric vehicle industries, geothermal systems, hydropower, tidal and wave energy harnessing, uninterruptable power supplies, emergency power, etc. For example, instead of large generators producing high speed and high voltage potentials, the generator could be a low speed, high current design that could provide current in line with the nature of high capacity cells. Advantages may include a reduction weight, operation under light loads or cruising speeds, and high efficiency.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Further embodiments of the invention are directed to simultaneous charging and discharging of battery banks. Such simultaneous charging and discharging can be implemented by virtue of separation between power source (e.g., homopolar generator) and load (e.g., appliances or other devices requiring power for operation), according to certain embodiments herein. In one embodiment, such separation may be accomplished at least in part by one or more battery banks that may be separated such that portions of the battery bank may be charged in parallel while other portions may be discharged in series. The portion of the battery bank that is being charged in parallel may continue being charged while another portion of the battery bank may be selectively disconnected from a power source for discharge to an inverter (e.g., DC-to-AC inverter) for supplying power to a load, hence separation between source and load. Once the discharging battery has completely discharged, it may be selectively connected to and recharged for future power distribution, while the portion of the battery bank that was previously being charged may be selectively disconnected and used to supply power to the same load, i.e., the load that was receiving its power source from the other portion of the battery bank, or a different load. Thus, in the manner of selectively switching between portions of battery banks that effectively isolate source and load, an extended or improved supply of power may be provided by implementing systems and processes described herein.

Figure 8:
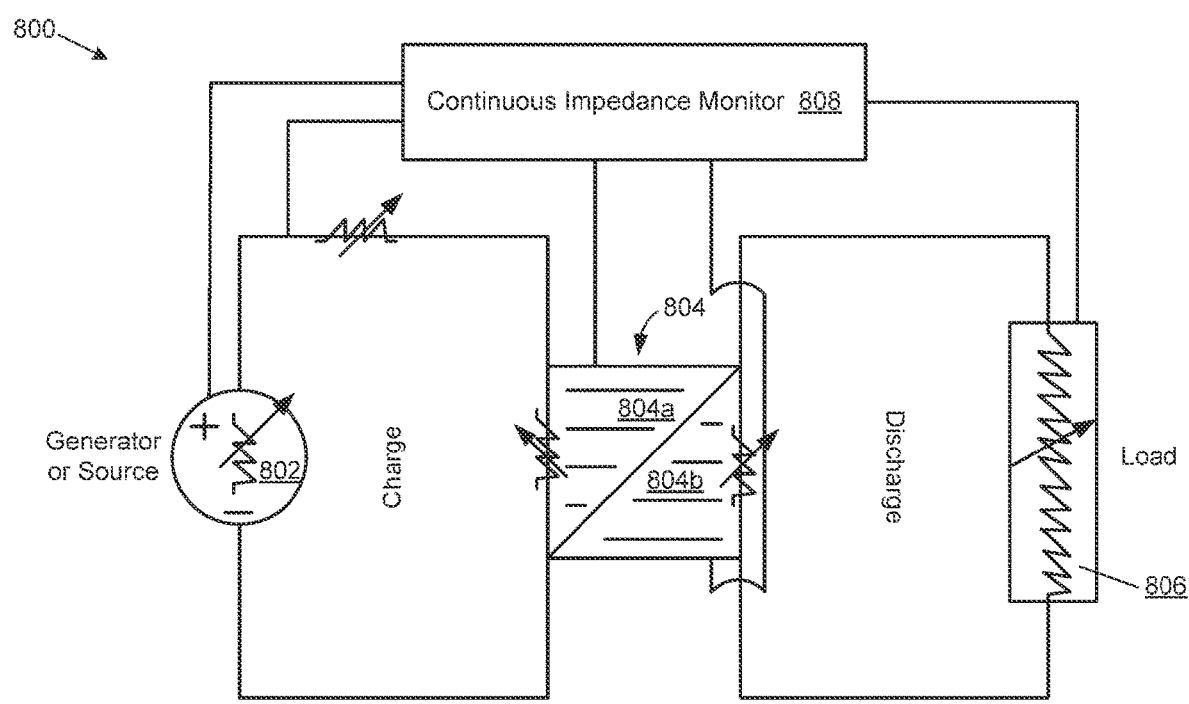
FIG. 8 depicts an example configuration of an apparatus for matching impedances between source and load, according to an example embodiment of the disclosure.

Certain embodiments herein are directed to attaining maximum power transfer from source to load when charging and discharging battery banks by matching impedances, i.e., the total opposition to alternating current by an electric circuit, between source and load. FIG. 8 depicts an example configuration of an apparatus for implementing such maximum power transfer between source and load. A generator or source 802, e.g., the homopolar generator described above, may supply power to a battery bank 804, which may have separate portions 804a and 804b. Each portion of the battery banks 804a and 804b may contain any number of batteries or battery cells. As shown in FIG. 8, battery portion 804a may receive a charge from source 802 while battery portion 804b may simultaneously discharge power to load 806. A continuance impedance monitor, such as that which may be provided by a switching controller 506 of FIG. 5 in one embodiment, may continually modify an impedance of the battery bank 804 to match an impedance of the source 802. For example, the continuous impedance monitor 808 may match the impedance of the battery portion 804a to that for the source 802 and simultaneously match the impedance of the battery portion 804b to that for the load 806. Thus, by separating source from load, certain embodiments herein may simultaneously control an impedance of the source and an impedance of the load independently of one another, e.g., to match impedances.

Numerous technical effects may result from implementations of certain embodiments described herein. As an example, impedance matching may enable battery banks to absorb energy faster and more efficiently while also discharging more efficiently. Additionally, impedance mismatches between source and load may be reduced, and therefore, conversion losses may be reduced. In certain embodiments, the battery bank may be the load, and thus control over a battery's impedance may be accomplished in these embodiments. Further, resistances of battery banks in series may be eliminated or greatly reduced by virtue of impedance matching as described herein.

While certain embodiments relate to simultaneous charging, discharging, and matching of impedances, some embodiments may involve such functions being performed substantially simultaneously or at approximately the same time other functions are performed. Functions or processes according to these embodiments may experience a lag or delay but may generally be performed while other described functions or processes are occurring.

According to various embodiments, a battery bank may be included in different locations with respect to a rotor of a homopolar generator charger. In one embodiment, a battery bank may be included within a rotor, i.e., integral to the rotor, while a battery bank may be external to the rotor in another embodiment. According to a configuration in which a battery bank is integral to a rotor, an output connection may exist to connect the battery bank to at least one additional battery bank. In one example, a source may charge the integral battery bank and, upon doing so, the source may then charge the external battery bank. Such charging of the external battery bank may be by virtue of the source completing its charge of the integral battery bank or a result of the source being switched, e.g., via a switching controller, to supply a charge to the external battery bank. According to this configuration, a smaller battery bank that may be internal to a rotor may act to power supply to a larger, external battery bank, which may in turn supply power to a load.

Other embodiments are directed to modifying the magnetic field relationship between the magnets and one or more rotors. In one embodiment, an alternating current (AC) signal may be used to impart a sonic frequency to the magnets, which may in turn expose a spinning rotor or conductor to more lines of force. Such exposure may have the effect of inducing additional current. In one embodiment, the AC signal may be produced by multiple rotors, e.g., a primary rotor and a secondary rotor, operating together in the homopolar generator system. An inductive material, such as steel or iron, may be laminated to the secondary rotor and may connect to an input associated with a continuous impedance monitor 808 such that when the secondary rotor rotates, a low-voltage AC signal (instead of a chopped DC signal) may be produced and fed into the continuous impedance monitor for use in modifying impedances in batteries or performing other functions. In one embodiment, the AC signal may be used to determine, e.g., by the continuous impedance monitor 808, an amount by which to modify the impedance of batteries being charged. The continuous impedance monitor 808 may continuously monitor such voltage, in one embodiment. As described above, by modifying DC source energy provided for a battery with an AC signal from a rotor source, e.g., a secondary rotating rotor, in contact with an inductive material, a battery may respond more rapidly as the AC signal more directly affects the ionic exchange (both the chemical and kinetic processes), thereby making it easier to absorb charge at a faster rate. The technical effect of such a configuration may be reduced time required to charge one or more batteries.

Other embodiments may be directed to increasing efficiency of a homopolar generator in part via the use of piezoelectric materials. In one embodiment, a rotor may include a copper disk and a different conductive material, and may serve as a battery (when stationary) or a capacitor (when moving). As alloys which may be used for a rotor vary, the impedance may also vary. In certain embodiments, impedance may be modified according to the material used such that as different types of alloys or materials are used, the AC signal received by the continuous impedance monitor may also change to account for the change in alloys or other materials.

Certain embodiments herein relate to providing an amount of charge to batteries that is consistent with the amount of charge required by a battery, not the amount of charge that a battery may desire or be capable of receiving over a certain time period. By updating a source or generator with information that a battery bank's impedance is a certain value, the generator may adjust accordingly such that the impedance of the battery bank is matched to provide improved power output to the battery bank. In this way, the generator is a variable impedance generator and is able to provide such functionality by virtue of a low-impedance source or generator.

Certain embodiments herein may also relate to a generation and storage system, i.e., power may be both generated and stored via use of such a generation and storage system or unit. Losses that may result from power generation and storage systems described herein may be compensated for via renewable energy sources, such as solar panels, wind, or small water generators.

Various conductor materials may be included on the surface of the rotors, e.g., via lamination or other attachment mechanisms that may layer such materials on a rotor, in one embodiment. The amount of current provided from a rotor may vary according to the type of material. Such materials may include piezoelectric materials, nanomaterials, copper materials, or alloys, as non-limiting examples. Piezoelectric materials may be used in association with the piezoelectric effect, which may be referred to as the linear electromechanical interaction between the mechanical and the electrical state in crystalline materials with no inversion symmetry. Materials that may exhibit either a direct or reverse piezoelectric effect may exist in certain embodiments herein.

In one embodiment, a steel material may be laminated to one or more rotors. According to this embodiment, the inductance and resistance of the steel material may be higher than that in other materials. Such higher inductances and resistances may be desirable in embodiments when a relatively higher voltage and relatively lower current may be desirable. Additionally, the magnets described herein may include a transducer to facilitate energy conversion in association with certain embodiments described herein.

Figure 9:
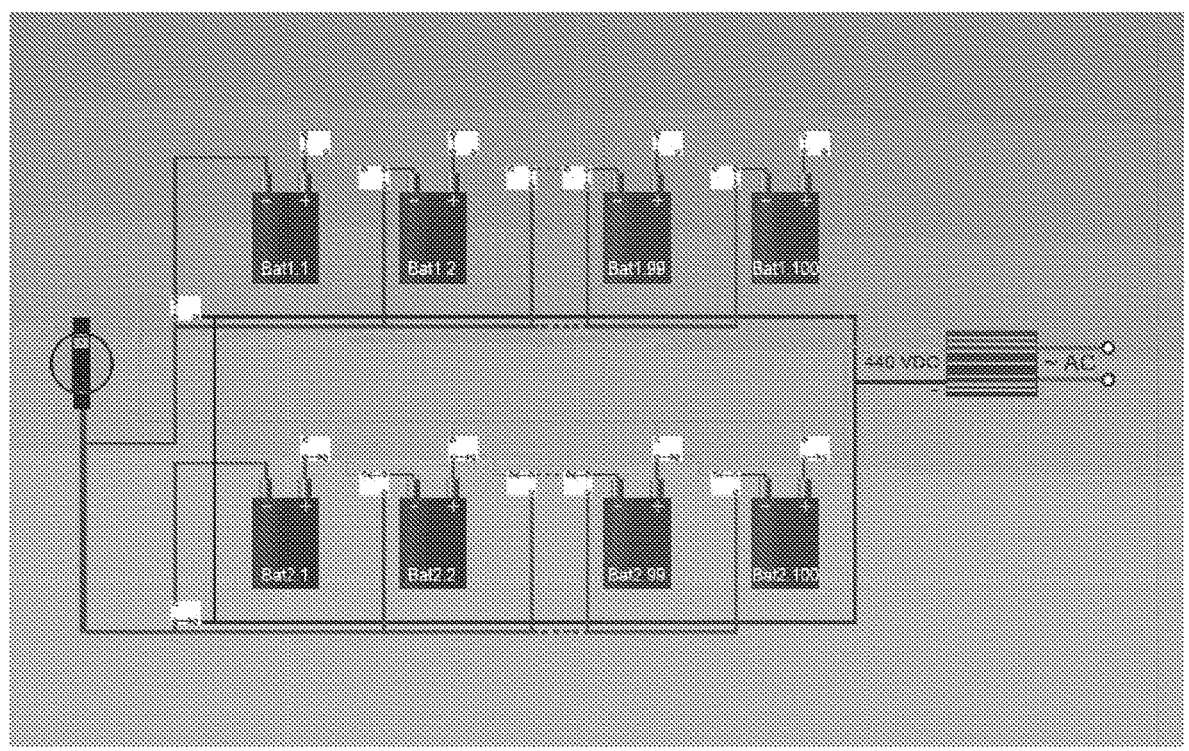
FIG. 9 illustrates an example computer simulation of an example configuration of the disclosure.

Other embodiments are directed to computer modeling to determine and illustrate the performance of generators and batteries graphically. Such computer modeling may be used to model the flow of current and its use by one or more switching controllers to manage simultaneous battery charging and discharging as described herein. FIG. 9 illustrates an example such computer simulation depicting one embodiment of the invention.

Example configurations of the homopolar generator are further described in FIGS. 10-13. The example configurations may include variations of the shaft, rotor, magnet arrangements, connection systems or brush systems, housings for enclosing these and other components, and other components of the homopolar generator.

As an example, the homopolar generator may include a housing that may enclose various components of the homopolar generator. Such a housing may include two halves in the example embodiment shown in FIG. 10. The example housing may include a top half 1001*a* and a bottom half 1001*b* as shown. Both halves 1001*a* and 1001*b* are shown in an exploded view for purposes of visibility and explanation of the components within the housing. Reference to the housing as including two halves is for purposes of illustration and is not meant to limit the example housing to include two portions each of which are approximately 50% in length, width, depth, or other dimension. While such a configuration may exist in one example, numerous other examples may exist.

According to one example configuration, at least a portion of the components shown in the top half 1001*a* of the housing may also exist in the bottom half 1001*b* of the housing. In this way, the two halves or portions 1001*a* and 1001*b* may mirror or partially mirror one another in example embodiments. Therefore, while FIG. 10 illustrates components primarily in the top half 1001*a*, at least a portion of these components may exist in the bottom half 1001*b*, as will be described in other example embodiments below.

Figure 10:
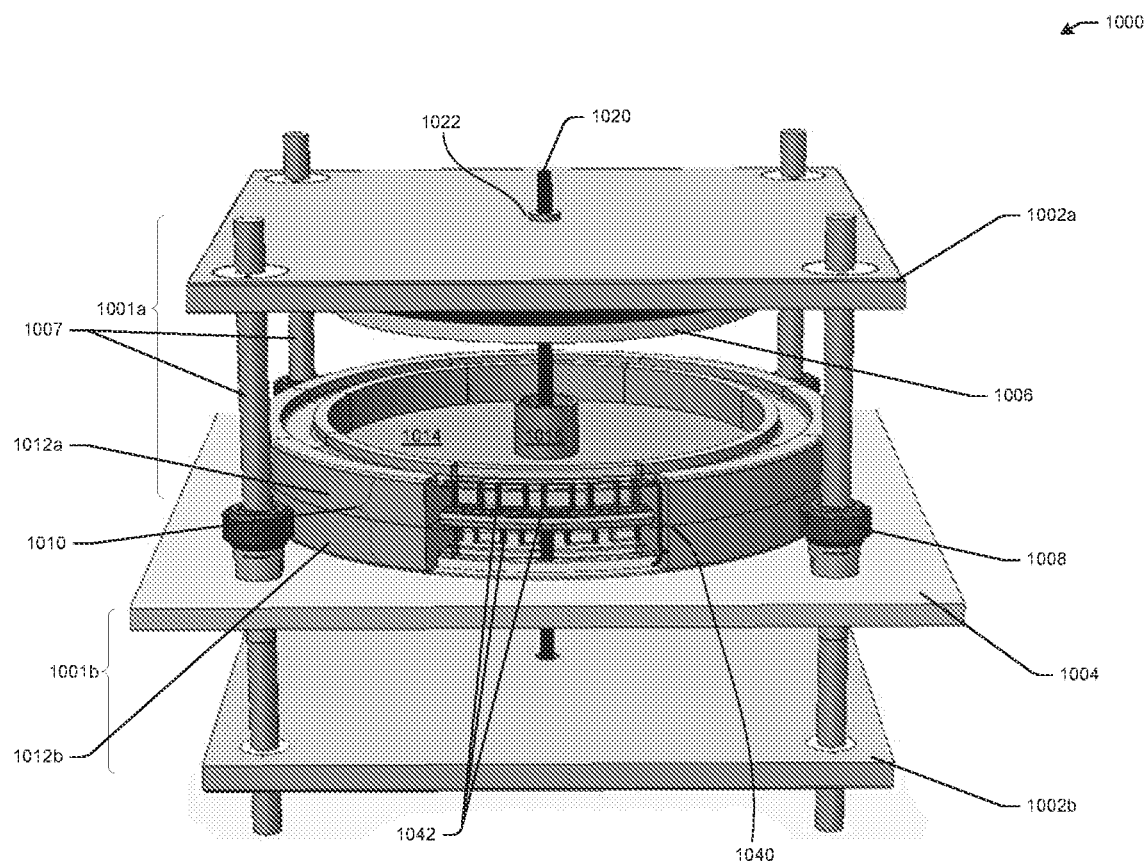
FIG. 10 illustrates an example configuration of a homopolar generator, according to an example embodiment of the disclosure.

As shown in FIG. 10, the example homopolar generator may include a housing that includes a mounting surface 1004 for supporting a track housing 1010 and two platens 1002*a* and 1002*b* on opposite sides of the track housing 1010. As will be described in greater detail below, soft iron plates or other types of materials may be coupled to at least a portion of the platens 1002*a* and 1002*b*, and the mounting surface 1004 to form a housing or enclosure for enclosing other components of the homopolar generator 1000 as described herein. In one configuration, the mounting surface 1004 may be located in the center between the platens 1002*a* and 1002*b* to facilitate the implementations and processes described herein. Various types of materials for the platens 1002*a* and 1002*b*, and the mounting surface 1004 and may be used including, but not limited to, metal, steel, copper, other relatively high conductivity materials, silver, gold, aluminum, nickel, etc.

While the halves 1001*a* and 1001*b* are shown in an exploded view for purposes of illustration, an actual example implementation of the homopolar generator 1000 may include a top half 1001*a* and a bottom half 1001*b* that are closer in distance to one another such that, among other things, the magnet array 1004 may be proximate to surfaces of the rotor 1014. As mentioned, soft iron plates or other materials may be coupled (e.g., bolted) along the perimeters of the platens 1002*a* and 1002*b* to form a complete or a partial enclosure. Such a configuration may effectively couple the outer and inner fields associated with the homopolar generator 1000 and may in effect provide a relatively greater magnetic field strength in the interior of the housing while eliminating unwanted or stray fields exterior to the housing. In an example implementation, the amount of flux density in the interior of the housing may be approximately 1.3 Tesla, whereas the amount of flux density associated with a housing that is not enclosed as described may be approximately 0.8 Tesla. Thus, an approximate 60% increase may be obtained by virtue of configuring a housing as described above.

The above configuration of the housing (for example, the combination of the top half 1001*a* and the bottom half 1001*b*) is for purposes of illustration and is not meant to be limiting. For example, the generally rectangular shape of the housing may include various other shapes and configuration in other embodiments. The housing may have a parabolic shape or other suitable shapes in other example embodiments.

The track housing 1010 may include various components to facilitate the implementations and processes described herein. For example, the track housing 1010 may include an upper track portion 1010*a* and a lower track portion 1010*b*. An opening or groove along a central portion of the track housing 1010 may exist where the upper track portion 1010*a* and the lower track portion 1010*b* join. Such a groove may receive at least a portion of the rotor 1014, for example, the periphery of the rotor 1014. The outermost edge of the rotor 1014 may be located at a distance along a central axis of the track housing 1012, in one configuration. Various materials for the track housing 1010 may be used including, but not limited to, plastic, hard plastic, wood, non-conductive materials, etc.

The track housing 1010 may house or enclose various components, such as a brush system 1040 that may include one or more brushes 1042, and various magnets having certain pole orientations embedded in the track housing 1010, among other components. In certain embodiments, the upper track portion 1010*a* and the lower track portion 1010*b* may include the same or at least a portion of the same components. Each of these components and example configurations of the track housing 1010 will be described in greater detail below.

Figure 13:
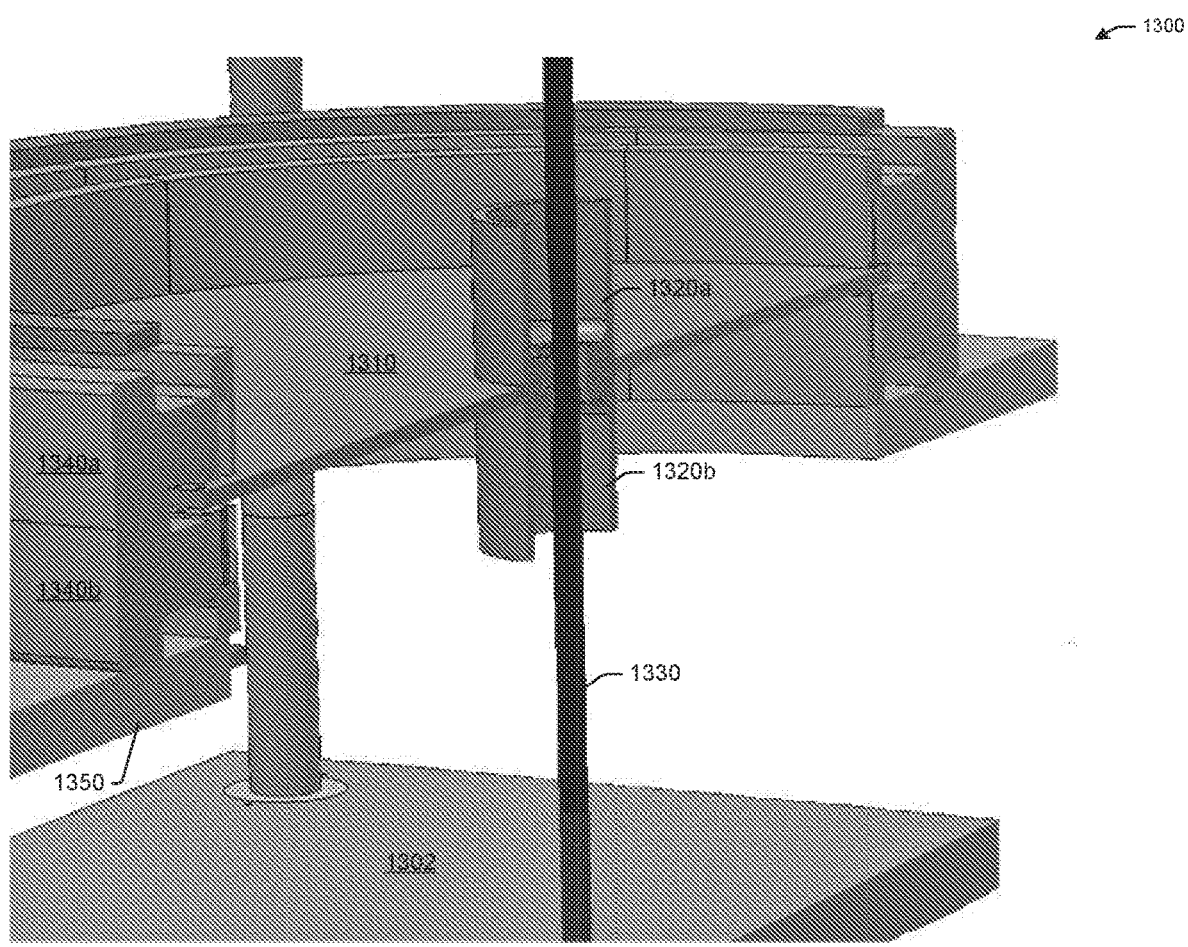
FIG. 13 illustrates an example configuration of a shaft with respect to a rotor of the homopolar generator, according to an embodiment of the disclosure.

FIG. 10 also depicts example shafts. For example, one or more cups 1016 may act as a shaft for providing a linkage for rotation of the rotor 1014. An opening in the rotor 1014 may enable the one or more cups 1016 to pass through the rotor 1014, as shown, and provide such a linkage for rotation. According to an example configuration, the cups 1016 may include two cups (e.g., an upper cup portion 1016*a* and a lower cup portion 1016*b*, which may be separated by the rotor 1014) may both comprise the shaft. As an example, FIG. 13 illustrates both an upper cup portion 1320*a* and a lower cup portion 1320*b* and will be described in greater detail below. According to these configurations, at least a portion of the upper cup portion 1016*a* may be coupled to a top surface of the rotor 1014, while at least a portion of the lower cup portion 1016*b* may be coupled to a bottom surface of the rotor 1014, as shown. According to this example configuration, the upper cup portion 1016*a* and the lower cup portion 1016*b* may serve as bushing surfaces that may enable rotation of the rotor 1014 without the use of metallic bearings and may further reduce typical losses at the point where the rotor 1014 interfaces with the ball screw shaft 1020.

The ball screw shaft 1020 may pass through the cups 1016, for example, along a central axis of the cups 1016 as shown in FIG. 10. In one configuration, a bushing may be coupled to an inner surface of one or more of the cups 1016 and to the ball screw shaft 1020. For example, a periphery of the bushing may be coupled to an inner surface of the upper cup portion 1016*a* and/or the lower cup portion 1016*b*, and an inner diameter of the bushing may be coupled to ball screw shaft 1020. In some configurations, multiple bushings may be used to facilitate such coupling. The couplings provided by the bushings may reduce movement of the rotor 1014, including horizontal, vertical, or other directions, for example, while the rotor 1014 is rotating. Various types of bushings may be used, such as Teflon, steel, metal, etc. in some embodiments, a bushing may be located on the outer surface of the cups 1106, for example, on either or both of the upper cup portion 1016*a* or the lower cup portion 1016*b*. Such a location of the bushing may facilitate the same or at least similar restriction on movement of the rotor 1014 as described above.

In addition to passing through the center of the cups 1016, the ball screw shaft 1020 may also pass through the platens 1020*a* and 1020*b* to, for example, facilitate securing the platens 1020*a* and 1020*b* in their respective positions relative to the rotor 1014. The ball screw shaft 1020, along with other components, may secure the platens 1020*a* and 1020*b* in their respective positions relative to the rotor 1014. A ball screw nut 1022 may secure the ball screw shaft 1020 to the platen 1020*a*, and a separate ball screw nut (not shown) may secure the ball screw shaft 1020 to the platen 1020*b*, in one configuration. In one embodiment, the ball screw nut 1022 may be threaded into the platens 1002*a* and 1002*b* such that various clearances of components in the homopolar generator 1000 may be established with respect to the rotor 1014. One or more shafts 1007 (four shown in FIG. 10) may further secure the platens with respect to the rotor 1014. In one configuration, the shafts 1007 may be sliding shafts with bushings 1008 that may facilitate such securement, as well as slidable movement of the shafts 1007.

Figure 12:
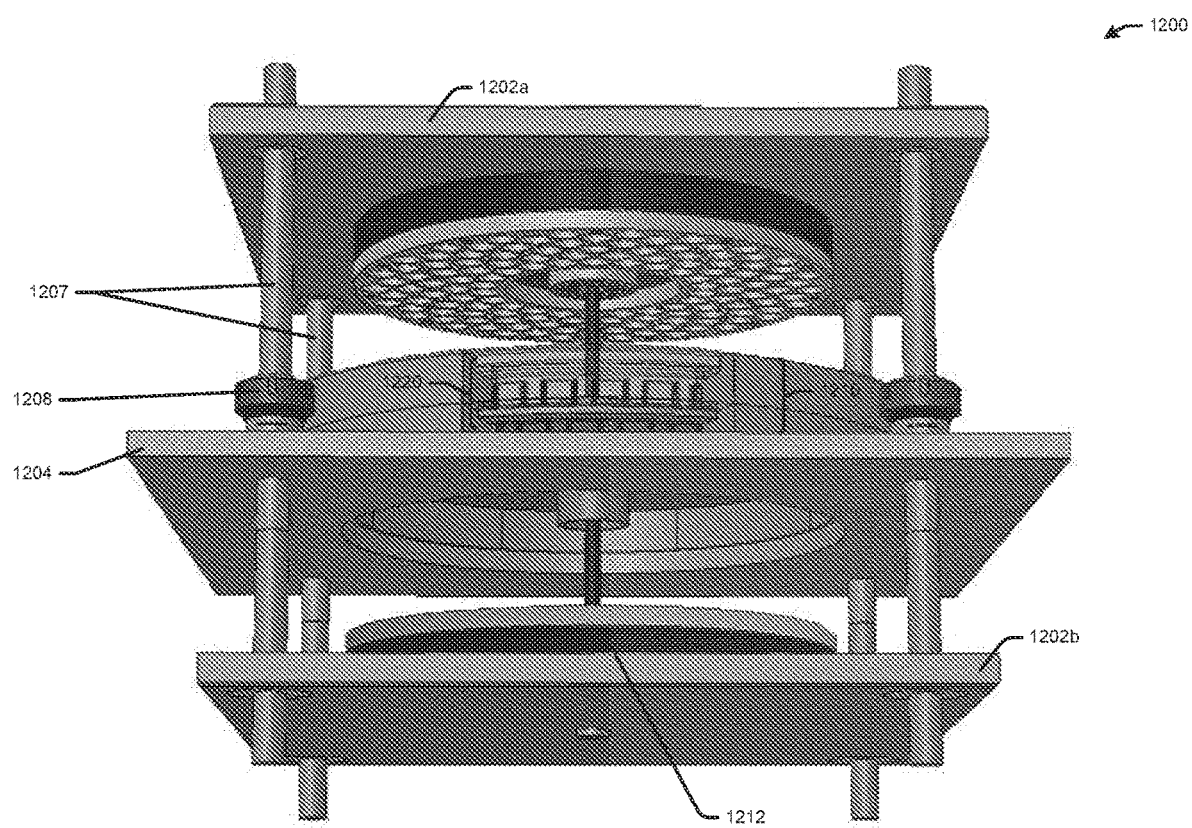
FIG. 12 illustrates an example configuration of the homopolar generator that includes multiple magnet arrays, according to an embodiment of the disclosure.

As further shown in FIG. 10, a magnet array 1006 may be coupled to the platens 1002*a* (e.g., via epoxy, glue, tape, other adhesive, welds, etc.). The magnet array 1006 may include one or more magnets for generating a magnetic flux field in which the rotor 1014 may rotate. The magnets in the magnet array 1006 may be opposed by magnets in another magnet array (not shown), which may be coupled to the platens 1002*b* and may also produce a magnetic flux field in which the rotor 1014 may rotate. FIG. 12 illustrates an example of such opposing magnet arrays and will be described in greater detail below.

In one configuration, the magnet arrays may be located proximate to the rotor 1014 and may be secured in such a position by virtue of the configurations described above. For example, the configurations and arrangements of the platens 1002*a* and 1002*b*, the ball screw nut 1022, and the shafts 2007 and coupled bushings 1008 with respect to one another, among other components, may enable such securement. In one embodiment, the magnet arrays may be secured in a position that is proximate and parallel, or substantially parallel, to surfaces of the rotor 1014. The coupling of the magnet arrays (for example, magnet array 1006 and an opposing magnet array (not shown)) to the platens 1002*a* and 1002*b*, respectively, may provide a method of coupling outer fields associated with the homopolar generator 1000, as described above. Soft iron plates, or other materials, may be coupled to the platens 1002*a* and 1002*b* to, in effect, complete a magnetic circuit including the outer fields or poles in which the platens 1002*a* and 1002*b* may act as magnets in the homopolar generator 1000. Such a configuration, as described above, may facilitate generating a relatively high amount of flux density in the interior of the housing that includes the top half 1001*a* and bottom half 1001*b*.

A technical effect of the above configurations may include, among other things, relatively accurate and stable clearances of the magnet arrays with respect to the rotor 1014, for example, while the rotor 1014 is rotating.

The above configurations, orientations, examples, etc., in FIG. 10 are for purposes of illustration and are not meant to be limiting. As described, components in addition to, or other than, those shown in FIG. 10 may also exist. For example, the rotor 1014 may include a bottom or opposing surface on the underside of the top surface shown in FIG. 10. The bottom surface of the rotor 1014 may also receive magnetic force generated at least in part by an opposing magnet array.

An example configuration that includes such an opposing magnet array is shown in FIG. 12, in which the magnet array 1211 may include magnets that oppose magnets in the magnet array 1206. The magnet arrays 1206 and 1212, which may be coupled to the platens 1202*a* and 1202*b*, respectively, as well as the magnet array 1006 in FIG. 10, may include magnet compartments 1212 for receiving the magnets. Various sizes and shapes of the compartments may exist for receiving various sizes and shapes of magnets. Numerous other configurations of the magnet arrays and other components in the homopolar generator 1000 may exist in other embodiments. Also as shown in FIG. 12, the homopolar generator 1200 may include a track housing 1210 that may be coupled to a center surface 1204 and supported at least in part by shafts 1207 that may include bushings 1208. The homopolar generator 1200 may further include a brush system 1220, which is comparable to a brush system that will be described in greater detail below.

Figure 11:
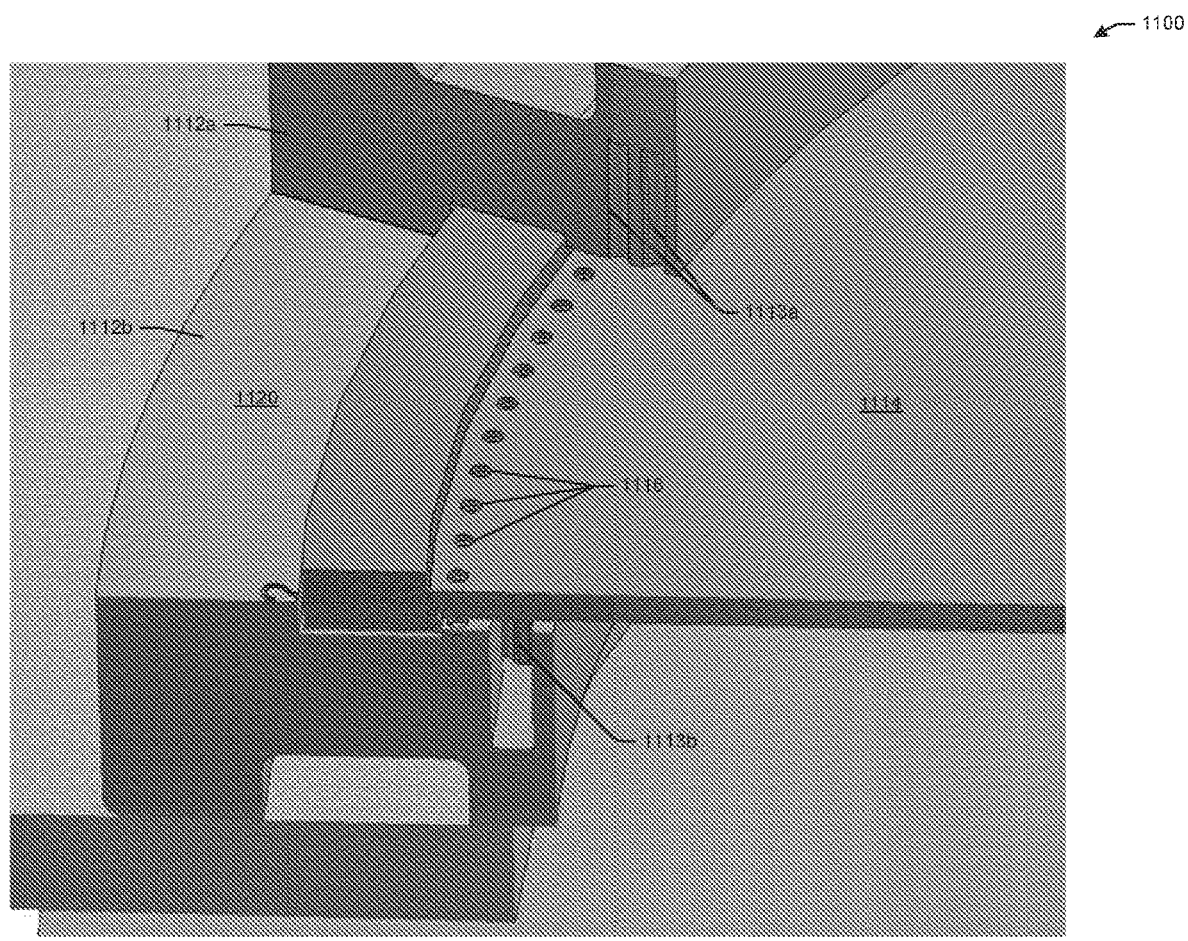
FIG. 11 illustrates an example track housing that includes various components of the homopolar generator, according to an embodiment of the disclosure.

FIG. 11 illustrates a cross-section of a track housing, such as the track housing 1010 in FIG. 10 described above, and associated components. The track housing 1010 may include various components, such as an upper track portion 1112*a*, a lower track portion 1112*b*, brush compartments 1113*a* and 1113*b* recessed within the upper track portion 1112*a* and the lower track portion 1112*b*, a rotor 1114, a linear arc ring 1120, and multiple magnets 1116 embedded in the rotor 1114, among other components.

In one configuration, the linear arc ring 1120 may be located around all or at least a portion of the periphery of the rotor 1114. In one embodiment, the linear arc ring 1120 may be secured or coupled to the rotor 1114 via various materials, such as epoxy, glue, tape, other adhesives, welds, or other mechanisms for securing the linear arc ring 1120 to the rotor 1114. The linear arc ring 1120 may include various materials, such as metal, steel, copper, other relatively high conductivity materials, plastic, etc. In an example configuration, the linear arc ring 1120 may be mounted to a base material, at least a portion of which may be coupled to the rotor 1114 for securing the linear arc ring 1120 to the rotor 1114. Various other configurations may exist for securing or coupling the linear arc ring 1120 to the rotor 1114.

In one configuration, the linear arc magnets may be arranged perpendicularly or approximately 90-degrees to the rotor 1114 instead of being substantially parallel or along a periphery of the rotor 1114, in one embodiment. According to the substantially perpendicular configuration of the linear arc magnets, the control head of the motor controller may be located along an edge of (or proximate to) the linear arc magnets. Various other configurations may exist in other embodiments.

According to certain configurations herein, the linear arc ring 1120 may include one or more magnets (not shown), which may be referred to herein as linear arc magnets. The linear arc magnets may be embedded in, adjacent to, or coupled to the linear arc ring 1120 such that the linear arc magnets may also be located along a periphery of the rotor 1114. In one embodiment, the linear arc magnets may be secured to the linear arc ring 1120 via various materials, such as epoxy, glue, tape, other adhesives, welds, etc. Various types and materials of the linear arc magnets may exist. In an example embodiment, the linear arc magnets may include neodymium magnets and may be approximately ¼-inches in thickness. Numerous other types, thicknesses, other dimensions, etc., of the linear arc magnets may exist in other examples. In another configuration, the linear arc magnets may be embedded in the rotor. According to this configuration, the rotor 1114 may be a single, coplanar rotor material. In yet another configuration, the linear arc magnets may be coupled to the rotor 1114. Various other configurations may exist.

The linear arc magnets coupled to the linear arc ring 1120 may be arranged in an alternating north-south north-south configuration, in one embodiment. The linear arc magnets may serve as a drive motor or a linear arc motor that may turn the rotor 1114. In one embodiment, the linear arc motor formed by the linear arc magnets may be driven by a multiphase (for example, a 3-phase) motor controller (not shown). According to one configuration, the motor controller may include a control head that includes a set of coils for driving the rotor 1114 or causing the rotor 1114 to rotate. In one configuration, the control head may be located along an edge of the rotor 1114 such that the rotor 1114 may be driven along its periphery. In one embodiment, the control head may be approximately 6-inches in length. Various other lengths and other dimensions may exist in other configurations. In one embodiment, the motor controller may capture and provide data, in real-time or near real-time, associated with a speed of the rotor 1114, current associated with the rotor 1114, voltage input slip rate, ramp-up curve, and other performance data. In some embodiments, a drive motor other than a linear arc motor configuration as described above may be used. According to these embodiments, any external motor that may be configured or otherwise capable of rotating the rotor 1114 may be used.

Also as shown in FIG. 11, the rotor 1114 may include multiple magnets 1116 that may be embedded in the rotor 1114. The multiple magnets 1116 may also be secured or coupled to the rotor 1114, in other embodiments. As shown, the multiple magnets 1116 may be located inside the linear arc ring 1120, or put another way, at a distance closer to the center of the rotor 1114 than the linear arc ring 1120. All or at least a portion of the magnets 1116 may face either north or south on one surface of the rotor 1114. Thus, in one configuration, the magnets 1116 may each include the same pole facing one direction. The magnets may be ¼-inch thick in one embodiment, or may be various other thicknesses, lengths, etc., in other embodiments.

In one configuration, the upper track portion 1112a may include multiple magnets (not shown) that may be recessed within or coupled to the upper track portion 1112a and may be located a distance above the multiple magnets 1116. As will be described, the lower track portion 1112b may also include magnets recessed therein or coupled thereto in similar fashion to that described in association with the upper track portion 1112a. The magnets in the upper track portion 1112a may oppose the magnets 1116 such that once the rotor spins (for example, via the linear arc motor described above), the rotor 1114 may float in the magnetic flux generated at least in part by the magnets 1116 and the opposing magnets in the upper track portion 1112a. Put another way, gyroscopic stabilization or spin stabilization may occur, thereby enabling the rotor 1114 to float.

In one embodiment, the opposing magnets in the upper track portion 1112a may be the same or approximately the same in number and size as the magnets 1116. The opposing magnets may also be embedded within the upper track portion 1112a such that they are directly above, or substantially vertical to, the magnets 1116. The upper track portion 1112a may also include one or more compartments 1113a for receiving brushes, such as the brushes 1042 in FIG. 10. Example brush configurations will be described in greater detail below.

As mentioned, each of the components described in association with the upper track portion 1112a may also exist in the lower track portion 1112b. For example, one or more magnets may be embedded in the upper track portion 1112b and may oppose the magnets 1116 in the rotor 1114 to further facilitate floating of the rotor 1114, as described above. As another example, the bottom half 1112b may also include brush compartments 1113b for receiving brushes, such as the brushes 1042 in FIG. 10.

The example configuration in FIG. 11 is shown for purposes of illustration and is not meant to be limiting. Numerous other configurations may exist. For example, the illustrated number of the magnets 1116, spacing between each of the magnets 1116, spacing between the magnets 1116 and the linear arc ring 1120, etc., may vary in other configurations. Also, the upper track portion 1112a may represent a cutaway section of an actual upper track portion 1112a for purposes of explanation. The magnets 1116, or at least a portion thereof, may be at least partially covered by the track housing (e.g., the upper track portion 1112a and the lower track portion 1112b).

Returning to FIG. 10, the track housing 1010 may include a brush system 1040 that may include multiple brushes, such as the brushes 1042 and 1044. A portion of the track housing 1010 has been cut away to facilitate viewing the brush system 1040, which may be otherwise enclosed within the track housing 1010 in certain embodiments herein. As shown in FIG. 10, at least a portion of the brushes in the brush system 1040 may be located in the upper track portion 1010a (for example, the brushes 1042) and at least a portion of the brushes in the brush system 1040 may be located in the lower track portion 1010b (for example, the brushes 1044). Although only two brushes 1042 and two brushes 1044 are indicated via arrows in FIG. 10, each of the brushes coupled to the upper track portion 1010a may be considered a brush 1042, while each of the brushes coupled to the lower track portion 1010b may be considered a brush 1044.

In one configuration, the brushes 1042 and 1044 may be mounted to their respective track halves 1012a or 1012b. In one embodiment, such mounting may be facilitated by the brush compartments 1113a and 1113b in FIG. 11. At least a portion of the brushes 1042 and 1044 may be inserted within the track portions 1010a and 1010b, for example, in the brush compartments 1113a and 1113b, which may encircle and secure the brushes 1042 and 1044, respectively. In one configuration, at least a portion of the brushes 1042 and 1044 may contact the a surface of the rotor 1010. For example, the brushes 1042 may contact the top surface (or visible surface) of the rotor 1010, while the brushes 1044 may contact the bottom surface of the rotor 1010. Such contacts of the brushes 1042 and 1044 on the rotor 1014 may be located inside of the magnets 1116 shown in FIG. 11 such that the magnets 1116 are located between the linear arc magnets coupled to the linear arc ring 1120 and the point at which the brushes 1042 and 1044 contact the rotor 1014.

In one embodiment, the brushes 1042 and 1044 may be mounted to their respective track portions 1010a and 1010b such that they alternate with respect to one another. For example, as shown in FIG. 10, a brush 1042 coupled to the upper track portion 1010a may not be located in the same opposing position as a brush 1044 coupled to the lower track portion 1010b. For purposes of explanation, if the track housing 1010 includes positions 1, 2, 3, 4, and 5, then the brushes 1042 may be located in positions 1 and 3, while the brushes 1044 may be located in positions 2, 4, and 5 (or more generally, not positions 1 and 3 or non-opposing positions). As another example, the brushes 1042 may be located in positions 1, 2, and 5, while the brushes 1044 may be located in positions 3 and 4 (or more generally, not positions 1, 2, and 5 or non-opposing positions). In this way, complete or approximate 100% coverage of the brushes 1042 and 1044 on the periphery of the rotor 1014 may be provided. Such a configuration may have the technical effect of reducing the formation of eddy currents, among other effects.

The brushes 1042 and 1044 may form a suspension system that may facilitate the brushes 1042 and 1044 remaining in contact with the rotor 1014, for example, when the rotor 1014 is rotating. Such a configuration of the brushes 1042 and 1044 may maintain contact with the rotor 1014 even with variations in the surfaces of the rotor 1014. The configuration of the platens 1002a and 1002b, ball screw shaft 1020, ball screw nut 1022, bushings 1008, etc., may also facilitate the presence of brushes that remain in contact (for example, constant contact) with surfaces of the rotor 1014, in certain embodiments. At least a portion of the brushes 1042 and 1044 may be metal fiber, copper, steel, or other conductive materials, according to various embodiments herein.

FIG. 13 depicts a cross-section of a homopolar generator 1300 that shows a shaft configuration including an upper cup portion 1320a and a lower cup portion 1320b (collectively referred to as cups 1320) coupled to the rotor 1310 and a ball screw shaft 1330 passing through the cups 1320. FIG. 13 also shows an upper track portion 1340a and a lower track portion 1340b of a track housing that is coupled to a center surface 1350, which may be located a distance above a platen 1302 and a distance below another platen (not shown).

According to one configuration, the central portion of the cups 1320 may include brushes (not shown) extending toward the ball screw shaft 1330. In one embodiment, the cups 1320 may have a brush volume (for example, in terms of total number of inches of brush used) that is the same or approximately the same as the brush volume used along the periphery of the rotor 1310, or the rotor 1114 as shown in FIG. 11. Such a configuration may provide a relatively balanced electrical circuit in terms of the number of ohms in the circuit. A technical effect of such a configuration may include a reduction in eddy currents that may be formed between the brushes (for example, the brushes 1042 and 1044 in FIG. 10) and the surface of the rotor 1310 (or the rotor 1014 in FIG. 10).

Certain configurations of the homopolar generator 1000 may include a bus bar or similar opening, groove, recessed portion, etc., in the track housing 1010 for receiving and passing various components, conductive materials, etc., for distributing electrical current, among other things. In some configurations, such a bus bar may not be located in the track housing but may be located within other portions, components, or surfaces of the homopolar generator 1000. In some embodiments, at least a portion of the bus bar may exist in one or more of the components or surfaces of the homopolar generator 1000.

As mentioned, the above example configurations of the homopolar generator may be used to charge various types of batteries. In one embodiment, positive and negative electrodes may be coupled to terminals on such batteries and to brushes in the brush systems described above to facilitate electrical communication from a rotor to a battery. Numerous other implementations, configurations, etc., may exist in other examples.

What is claimed is:

1. A method comprising:
   charging, by a battery system, a first portion of a battery comprising one or more first cells;
   determining that a first impedance of the first portion of the battery is different than a second impedance of a charging device electrically connected to the battery;
   producing a first low-voltage AC signal to modify the first impedance to match the second impedance.

2. The method of claim 1, further comprising:
   determining that a predetermined time threshold has elapsed; and
   determining that the first impedance is substantially the same as the second impedance before the predetermined time threshold has elapsed.

3. The method of claim 1, wherein a second portion of the battery, comprising one or more second cells, is discharged while the first portion is being charged.

4. The method of claim 3, wherein at least a portion of the one or more first cells are charged in parallel while at least a portion of the one or more second cells are discharged in series.

5. The method of claim 3, further comprising:
   causing a third impedance of the second portion of the battery to substantially match the second impedance.

6. The method of claim 1, further comprising:
   determining a first signal; and
   causing a configuration of the first portion of the battery to be modified from a series connection to a parallel connection.

7. The method of claim 1, wherein causing the first impedance to match the second impedance comprises causing the first impedance to match the second impedance using a switching controller.

8. The method of claim 1, further comprising:
   determining an amount by which the first impedance differs from the second impedance using an impedance monitor.

9. The method of claim 1, wherein the battery system comprises a variable impedance generator configured to modify the first impedance and the second impedance.

10. The method of claim 3, wherein the battery system is configured to simultaneously control a source impedance corresponding to the first impedance and a load impedance corresponding to a third impedance.

11. A battery system comprising:
    memory comprising computer-executable instructions; and
    at least one processor configured to access the at least one memory and execute the computer-executable instructions to:
      charge a first portion of a battery comprising one or more first cells;
      determine that a first impedance of the first portion of the battery is different than a second impedance of a charging device electrically connected to the battery;
      cause the first impedance to match the second impedance by producing a first low-voltage AC signal to modify the first impedance to match the second impedance.

12. The battery system of claim 11, wherein the at least one processor is further configured to access the at least one memory and execute the computer-executable instructions to:
    determine that a predetermined time threshold has elapsed; and
    determine that the first impedance is substantially the same as the second impedance before the predetermined time threshold has elapsed.

13. The battery system of claim 11, wherein a second portion of the battery comprising one or more second cells is discharged while the first portion is being charged.

14. The battery system of claim 13, wherein at least a portion of the one or more first cells are charged in parallel while at least a portion of the one or more second cells are discharged in series.

15. The battery system of claim 13, wherein the at least one processor is further configured to access the at least one memory and execute the computer-executable instructions to:
    cause the third impedance of the second portion of the battery to substantially match the second impedance.

16. The battery system of claim 11, wherein the at least one processor is further configured to access the at least one memory and execute the computer-executable instructions to:
    determine a first signal; and
    cause a configuration of the first portion of the battery to be modified from a series connection to a parallel connection.

17. The battery system of claim 11, wherein the at least one processor is configured to cause the first impedance to match the second impedance by executing the computer-accessible instructions to cause the first impedance to match the second impedance using a switching controller.

18. The battery system of claim 11, wherein the at least one processor is further configured to access the at least one memory and execute the computer-executable instructions to:
    determine an amount by which the first impedance differs from the second impedance using an impedance monitor.

19. The battery system of claim 11, wherein the battery system comprises a variable impedance generator configured to modify the first impedance and the second impedance.

20. The battery system of claim 13, wherein the battery system is configured to simultaneously control a source impedance corresponding to the first impedance and a load impedance corresponding to the third impedance.

* * * * *